United States Patent
Afshar et al.

(10) Patent No.: US 12,238,724 B1
(45) Date of Patent: Feb. 25, 2025

(54) INSTRUCTION-BASED MULTI-THREAD MULTI-MODE PUSCH AND PUCCH ENCODERS FOR CELLULAR DATA DEVICES

(71) Applicant: Apple Inc., Cupertino, CA (US)

(72) Inventors: Hadi Afshar, San Diego, CA (US); Mohanned Sinnokrot, San Diego, CA (US)

(73) Assignee: Apple Inc., Cupertino, CA (US)

( * ) Notice: Subject to any disclaimer, the term of this patent is extended or adjusted under 35 U.S.C. 154(b) by 394 days.

(21) Appl. No.: 17/661,475

(22) Filed: Apr. 29, 2022

Related U.S. Application Data

(60) Provisional application No. 63/261,652, filed on Sep. 24, 2021.

(51) Int. Cl.
*H04W 72/21* (2023.01)
*H04L 1/00* (2006.01)

(52) U.S. Cl.
CPC ........... *H04W 72/21* (2023.01); *H04L 1/0057* (2013.01); *H04L 1/0061* (2013.01)

(58) Field of Classification Search
CPC .................................................. H04W 72/21
See application file for complete search history.

(56) References Cited

U.S. PATENT DOCUMENTS

| | | | |
|---|---|---|---|
| 5,809,320 A | 9/1998 | Jain et al. | |
| 6,163,837 A * | 12/2000 | Chan | G06F 9/3885 712/216 |
| 7,729,384 B1 * | 6/2010 | Mantri | H04L 1/0084 370/476 |
| 9,516,663 B2 * | 12/2016 | Muharemovic | H04L 5/0048 |
| 11,025,326 B2 * | 6/2021 | Davydov | H04B 7/0656 |
| 11,595,154 B1 * | 2/2023 | Hsu | H04L 1/0059 |
| 11,616,596 B1 * | 3/2023 | Sutharsan | G06F 9/3851 455/450 |
| 11,664,828 B1 * | 5/2023 | Afshar | H03M 13/6561 714/755 |
| 2005/0081015 A1 * | 4/2005 | Barry | G06F 9/3861 712/E9.046 |
| 2008/0117962 A1 * | 5/2008 | Kim | H04L 27/2647 375/261 |
| 2018/0368167 A1 * | 12/2018 | Kim | H04W 28/0278 |

(Continued)

OTHER PUBLICATIONS

Beltrame, Giovanni, "A Model for Assembly Instruction Timing and Power Estimation on Superscalar Architectures." Politecnico di Milano, final report, version 1.4. 2002. 88 pages.

(Continued)

*Primary Examiner* — Guang W Li
(74) *Attorney, Agent, or Firm* — Kilpatrick Townsend & Stockton LLP

(57) ABSTRACT

A cellular modem processor can include dedicated processing engines that implement specific, complex data processing operations. To implement PUSCH and PUCCH encoding, a cellular modem can include a pipeline having multiple processing engines, with each processing engine including functional units that execute instructions corresponding to different stages in the encoding process. Flow control and data synchronization between instructions can be provided using a hybrid of firmware-based flow control and hardware-based data dependency management.

20 Claims, 20 Drawing Sheets

(56) References Cited

U.S. PATENT DOCUMENTS

| | | | |
|---|---|---|---|
| 2020/0042479 A1* | 2/2020 | Wang | G06F 9/3004 |
| 2020/0301826 A1* | 9/2020 | Appu | G06F 12/0246 |
| 2021/0390004 A1* | 12/2021 | Kundu | G06F 9/545 |
| 2022/0413928 A1* | 12/2022 | Banuli Nanje Gowda | H04W 28/16 |
| 2023/0070361 A1* | 3/2023 | Papadopoulou | H03M 13/6561 |
| 2023/0095363 A1* | 3/2023 | Hsu | G06F 9/30087 |
| | | | 712/214 |

OTHER PUBLICATIONS

Asanović, Krste, "Vector Microprocessors," A dissertation for the degree of Doctor of Philosophy in Computer Science in the Graduate Division of the University of California, Berkeley. Spring 1998. 268 pages.

* cited by examiner

INSTRUCTION-BASED MULTI-THREAD MULTI-MODE PUSCH AND PUCCH ENCODERS FOR CELLULAR DATA DEVICES

CROSS-REFERENCES TO RELATED APPLICATIONS

This application claims the benefit of provisional application No. 63/261,652, filed Sep. 24, 2021, the disclosure of which is incorporated herein by reference.

This disclosure includes subject matter related to the following U.S. patent applications: U.S. patent application Ser. No. 17/448,863, filed Sep. 24, 2021, the disclosure of which is incorporated herein by reference in its entirety.

BACKGROUND

The present disclosure relates generally to cellular data processing and, in particular, to implementation of an encoder for a physical uplink shared channel (PUSCH) and a physical uplink control channel (PUCCH) in a cellular data device.

With the advent of high-speed cellular data communication, users of mobile devices are increasingly able to access information when and where they need it. Cellular data communication standards, promulgated by the 3rd Generation Partnership Project (3GPP), enable radio-frequency communication between a base station (typically implemented at a cellular antenna tower) and various user equipment (UE), which can be a mobile device such as a smart phone, tablet, wearable device, or the like, via an "uplink" from the UE to the base station and a "downlink" from the base station to the UE.

Standards promulgated by 3GPP include specifications for radio access networks (RANs), such as 4G Long-Term Evolution (referred to herein as "4G" or "LTE") and 5G New Radio (referred to herein as "5G" or "NR"). The 4G and 5G RAN specifications define multiple logical channels between the base station and the UE, including a physical uplink shared channel (PUSCH) and physical downlink shared channel (PDSCH) that transmit application-layer data, as well as a physical uplink control channel (PUCCH) and physical downlink control channel (PDCCH) that transmit control data used to specify various parameters associated with data transmission on the shared channels.

The specifications also define the sequence of operations used to prepare data for transmission as a radio-frequency (RF) signal on each channel. By way of example of the complexity involved, the general sequence of operations for PDSCH involves the following steps: The base station receives a transport block consisting of a sequence of data bits to be communicated to the UE. The base station adds cyclic redundancy check (CRC) bits, segments the transport block based on a maximum codeword size, adds CRC bits per-segment, encodes each segment using an encoding algorithm that adds parity bits to enable error correction, performs bit interleaving and rate matching operations that improve robustness against channel loss, and applies a scrambling algorithm. The resulting bit sequence is then mapped onto a sequence of modulation symbols that are assigned to subcarrier frequencies and time bins (typically referred to as "resource elements"). An inverse Fast Fourier Transform (IFFT) generates a digital representation of a waveform that can be converted to analog, mixed with a carrier frequency, and transmitted via an antenna (or antennal array) to the UE. The UE reverses the base-station operations to recover the data. For instance, the UE can receive the RF signal, extract a baseband signal by removing the carrier frequency, generate a digitized representation of the baseband signal, and apply a Fast Fourier Transform (FFT) to transform the signal to frequency domain. A demapper can apply a channel estimate to produce a sequence of log likelihood ratios (LLRs) representing the relative probability of each transmitted bit being either 0 or 1. The LLR sequence can be descrambled, de-interleaved and de-rate-matched, decoded, and error-corrected (based on parity and CRC bits after decoding), thereby producing output data blocks. For PUSCH, the sequence of operations is similar, with the roles of base station and UE reversed. PUCCH and PDCCH, which generally include smaller blocks of data, have their own associated sequences of operation. The particular operations and sequences may vary; for instance the shared channels for 4G and 5G use different encoding algorithms and a different order of interleaving and rate matching operations.

To manage these operations at high data rates, the UE typically includes a dedicated cellular modem. A cellular modem can be implemented as one or more integrated circuits, logically separated into a "baseband" processor and a "radio-frequency," or "RF," processor. The baseband processor handles operations such as segmentation, encoding, interleaving and rate matching, and scrambling for the uplink channels (and the reverse operations for the downlink channels), while the RF processor handles waveform generation and all analog operations.

Many types of UE are portable, battery-powered devices such as smart phones, tablets, wearable devices, and the like. For such devices, it is desirable to have a cellular modem that is area-efficient and power-efficient while supporting high data rates. In addition, to support mobility across a range of geographic areas where base stations supporting different standards may be available, it is also desirable that the same modem can support multiple cellular data communication specifications, e.g., both 4G and 5G.

SUMMARY

According to some embodiments described herein, a cellular modem processor can include dedicated processing engines that implement specific, complex data processing operations. To implement operations such as PUSCH and PUCCH encoding, a cellular modem can include various pipelines of processing engines, with each processing engine including functional units that execute instructions corresponding to different steps in a sequence of operations. For instance, the functional units in a PUSCH and PUCCH encoding pipeline can include functional units executing instructions to perform different channel coding operations, rate matching and interleaving, scrambling, and mapping onto OFDM symbols. Flow control or data synchronization between instructions is provided using a hybrid of firmware-based flow control and hardware-based data dependency management. For instance, firmware instructions can define data flow by a sequence of instructions that provide input and output virtual addresses for each operation, where the input and output virtual addresses are mapped to (physical) buffers in the pipeline such that each buffer has a unique virtual address. A hardware interlock controller within the pipeline can track and enforce the data dependencies for the pipeline based on the virtual addresses.

Some embodiments relate to a processing system that can include processing engines, buffers, a control processor, and an interlock controller. The processing engines include functional units configured to execute an instruction having an input virtual address and an output virtual address. For example, a first processing engine can have two or more encoder functional units configured to execute two or more channel coding instructions to encode a code block, wherein different encoder functional units are configured to execute different channel coding instructions. A second processing engine can have a mapping functional unit configured to execute a mapping instruction to map at least a portion of a code block to one or more modulation symbols in a constellation. The buffers can be coupled to the processing engines, and different buffers can be mapped to different virtual addresses in a virtual address space. The buffers can include an encoder input buffer, an encoder output buffer, and a symbol buffer. The control processor can be coupled to the processing engines and configured to dispatch a sequence of instructions to the processing engines to encode code blocks including a physical uplink shared channel (PUSCH) code block and a physical uplink control channel (PUCCH) code block. The sequence of instructions for a particular code block can include a selected channel coding instruction selected from the two or more channel coding instructions and having an input virtual address that maps to a first region in the encoder input buffer and an output virtual address that maps to a first region in the encoder output buffer and a mapping instruction having an input virtual address that maps to the first region in the encoder output buffer and an output virtual address that maps to a region in the symbol buffer. The interlock controller can be coupled to the processing engines and configured to manage data dependencies based on the input virtual addresses and the output virtual addresses of the instructions.

In some embodiments, a processing engine can also include a dispatch queue, a dispatch queue interface, and an instruction interface. The dispatch queue can be configured to queue one or more instructions. The dispatch queue interface can be configured to: receive, in order, the dispatched instructions from the control processor; queue the dispatched instructions in the dispatch queue for in-order execution; and communicate a read-lock request for the input virtual address and a write-lock request for the output virtual address to the interlock controller. The instruction interface can be configured to communicate with the interlock controller to determine whether data dependencies for a next instruction queued in the dispatch queue are cleared, wherein the instruction interface initiates execution of the next instruction after the interlock controller indicates that the data dependencies are cleared.

In some embodiments, the encoder functional units can include a first encoder functional unit configured to perform low-density parity check (LDPC) coding on a code block in response to an LDPC channel coding instruction and a second encoder functional unit configured to perform polar coding on a code block in response to a polar channel coding instruction. In some embodiments, the encoder functional units can also include a third encoder functional unit configured to perform Turbo coding on a code block in response to a Turbo channel coding instruction and a fourth encoder functional unit configured to perform convolutional coding on a code block in response to a convolutional channel coding instruction. In some embodiments, the control processor is further configured such that: when the sequence of instructions is dispatched to encode a PUSCH code block for a 5G radio area network, the selected channel coding instruction is the LDPC channel coding instruction; when the sequence of instructions is dispatched to encode a PUCCH code block for a 5G radio area network, the selected channel coding instruction is the polar channel coding instruction; when the sequence of instructions is dispatched to encode a PUSCH code block for a 4G radio area network, the selected channel coding instruction is the Turbo channel coding instruction; and when the sequence of instructions is dispatched to encode a PUCCH code block for a 4G radio area network, the selected channel coding instruction is the convolutional channel coding instruction.

In some embodiments, the processing engines can include a third processing engine having a first load functional unit and a second load functional unit. The first load functional unit can be configured to execute a data loading instruction to load a PUSCH code block from a shared memory, the data loading instruction having an output virtual address that maps to one of the encoder input buffers. The second load functional unit can be configured to execute an upstream control information (UCI) loading instruction to load a UCI code block based on UCI received from the control processor, the UCI loading instruction having an output virtual address that maps to one of the encoder input buffers. The control processor can be further configured to dispatch the data loading instruction for a PUSCH code block prior to dispatching the selected channel coding instruction for the PUSCH code block and to dispatch the UCI loading instruction for a PUCCH code block prior to dispatching the selected channel coding instruction for the PUCCH code block.

In some embodiments, the second processing engine can also include one or more functional units configured to perform rate matching and interleaving for a code block prior to executing the mapping instruction.

In some embodiments, the processing engines can includes a third processing engine that includes a functional unit configured to execute a store instruction having an input virtual address that maps to a region in the symbol buffer and an output address that maps to a shared memory.

In some embodiments, the control processor can be configured to dispatch instructions from the sequence of instructions for the PUSCH code block and instructions from the sequence of instructions for the PUCCH code block in an interleaved order.

Some embodiments relate to a cellular modem processor having multiple processing pipelines, including an uplink pipeline. The uplink pipeline can include processing engines, buffers, a control processor, and an interlock controller. The processing engines include functional units configured to execute an instruction having an input virtual address and an output virtual address. For example, a first processing engine can have two or more encoder functional units configured to execute two or more channel coding instructions to encode a code block, wherein different encoder functional units are configured to execute different channel coding instructions. A second processing engine can have a mapping functional unit configured to execute a mapping instruction to map at least a portion of a code block to one or more modulation symbols in a constellation. The buffers can be coupled to the processing engines, and different buffers can be mapped to different virtual addresses in a virtual address space. The buffers can include an encoder input buffer, an encoder output buffer, and a symbol buffer. The control processor can be coupled to the processing engines and configured to dispatch a sequence of instructions to the processing engines to encode code blocks including a physical uplink shared channel (PUSCH) code block and a physical uplink control channel (PUCCH) code block. The sequence of instructions for a particular code block can include a selected channel coding instruction selected from the two or more channel coding instructions and having an input virtual address that maps to a first region in the encoder input buffer and an output virtual address that maps to a first region in the encoder output buffer and a mapping instruction having an input virtual address that maps to the first region in the encoder output buffer and an output virtual address that maps to a region in the symbol buffer. The interlock controller can be coupled to the processing engines and configured to manage data dependencies based on the input virtual addresses and the output virtual addresses of the instructions.

In some embodiments, the pipelines can also include a physical downlink control channel (PDCCH) decode pipeline configured to decode downlink control information received via a radio area network and wherein the control processor is further configured to provide configuration parameters to the uplink pipeline based at least in part on the decoded downlink control information.

In some embodiments, the cellular modem processor can also include a shared memory coupled to at least two of the processing pipelines, including the uplink pipeline.

In some embodiments, the encoder functional units can include a first encoder functional unit configured to perform low-density parity check (LDPC) coding on a code block in response to an LDPC channel coding instruction and a second encoder functional unit configured to perform polar coding on a code block in response to a polar channel coding instruction. In some embodiments, the encoder functional units can also include a third encoder functional unit configured to perform Turbo coding on a code block in response to a Turbo channel coding instruction and a fourth encoder functional unit configured to perform convolutional coding on a code block in response to a convolutional channel coding instruction.

In some embodiments, the control processor can be configured to dispatch instructions from the sequence of instructions for the PUSCH code block and instructions from the sequence of instructions for the PUCCH code block in an interleaved order.

Some embodiments can relate to a method that can include: generating, at a cellular modem processor having an uplink pipeline and a control processor, a first code block containing data to be transmitted using a physical uplink shared channel (PUSCH); generating, by the cellular modem processor, a second code block containing uplink control information to be transmitted using a physical uplink control channel (PUCCH); dispatching, by the control processor, a first sequence of instructions to the uplink pipeline for the first code block and a second sequence of instructions to the uplink pipeline for the second code block, where the first sequence of instructions includes a first channel coding instruction selected from a set of different channel coding instructions, the first channel coding instruction having an input virtual address that maps to a first region in an encoder input buffer and an output virtual address that maps to a first region in an encoder output buffer, a first rate matching instruction having an input virtual address that maps to the first region in the encoder output buffer, and a first mapping instruction that operates on a bit sequence generated by the first rate matching instruction, wherein the second sequence of instructions includes a second channel coding instruction selected from the set of channel coding instructions, the second channel coding instruction having an input virtual address that maps to a second region in an encoder input buffer and an output virtual address that maps to a second region in an encoder output buffer, a second rate matching instruction having an input virtual address that maps to the second region in the encoder output buffer, and a second mapping instruction that operates on a bit sequence generated by the second rate matching instruction; receiving the dispatched instructions in respective dispatch queues in a plurality of processing engines in the uplink pipeline, where the processing engine in which a particular issued instruction is received includes a functional unit configured to execute the particular issued instruction; sending, by the processing engines in response to receiving a dispatched instruction, a read-lock request for the input virtual address and a write-lock request for the output virtual address to an interlock controller of the uplink pipeline; issuing, from the dispatch queues, dispatched instructions to the functional units configured to execute the instructions, wherein instructions in a same one of the dispatch queues are issued in order and wherein the instruction interface issues a next instruction only after the interlock controller confirms, based on the input virtual address and the output virtual address, that data dependencies for the next instruction have been cleared; and executing issued instructions by the functional units, wherein executing an issued instruction includes one or both of reading from the region mapped to the input virtual address or writing to the region mapped to the output virtual address.

In some embodiments, the first channel coding instruction can be executed by a first functional unit in a first one of the processing engines, the first functional unit being configured to perform low-density parity check (LDPC) coding, and the second channel coding instruction can be executed by a second functional unit in the first one of the processing engines, the second functional unit being configured to perform polar coding.

In some embodiments, the first channel coding instruction can be executed by a first functional unit in a first one of the processing engines, the first functional unit being configured to perform Turbo coding, and the second channel coding instruction can be executed by a second functional unit in the first one of the processing engines, the second functional unit being configured to perform convolutional coding.

In some embodiments, when the control processor is operating the uplink pipeline in a 5G mode, the first channel coding instruction can be an instruction to perform low-density parity check (LDPC) coding and the second channel coding instruction can be an instruction to perform polar coding. In some embodiments, when the control processor is operating the uplink pipeline in a 4G mode, the first channel coding instruction can be an instruction to perform Turbo coding and the second channel coding instruction can be an instruction to perform convolutional coding.

In some embodiments, the first sequence of instructions can include a first load instruction to read data for the code block from an externally-shared memory, the load instruction having an output virtual address that maps to the first region in the encoder input buffer, where the first load instruction is prior to the first channel coding instruction in the first sequence. The second sequence of instructions can include a second load instruction to load uplink control information from the control processor, the second load instruction having an output virtual address that maps to the second region in the encoder input buffer, where the second load instruction is prior to the second channel coding instruction in the second sequence.

The following detailed description, together with the accompanying drawings, will provide a better understanding of the nature and advantages of the claimed subject matter.

DETAILED DESCRIPTION

The following description of exemplary embodiments is presented for the purpose of illustration and description. It is not intended to be exhaustive or to limit the claimed embodiments to the precise form described, and persons skilled in the art will appreciate that many modifications and variations are possible. The embodiments have been chosen and described in order to best explain their principles and practical applications to thereby enable others skilled in the art to best make and use various embodiments and with various modifications as are suited to the particular use contemplated.

Figure 1:
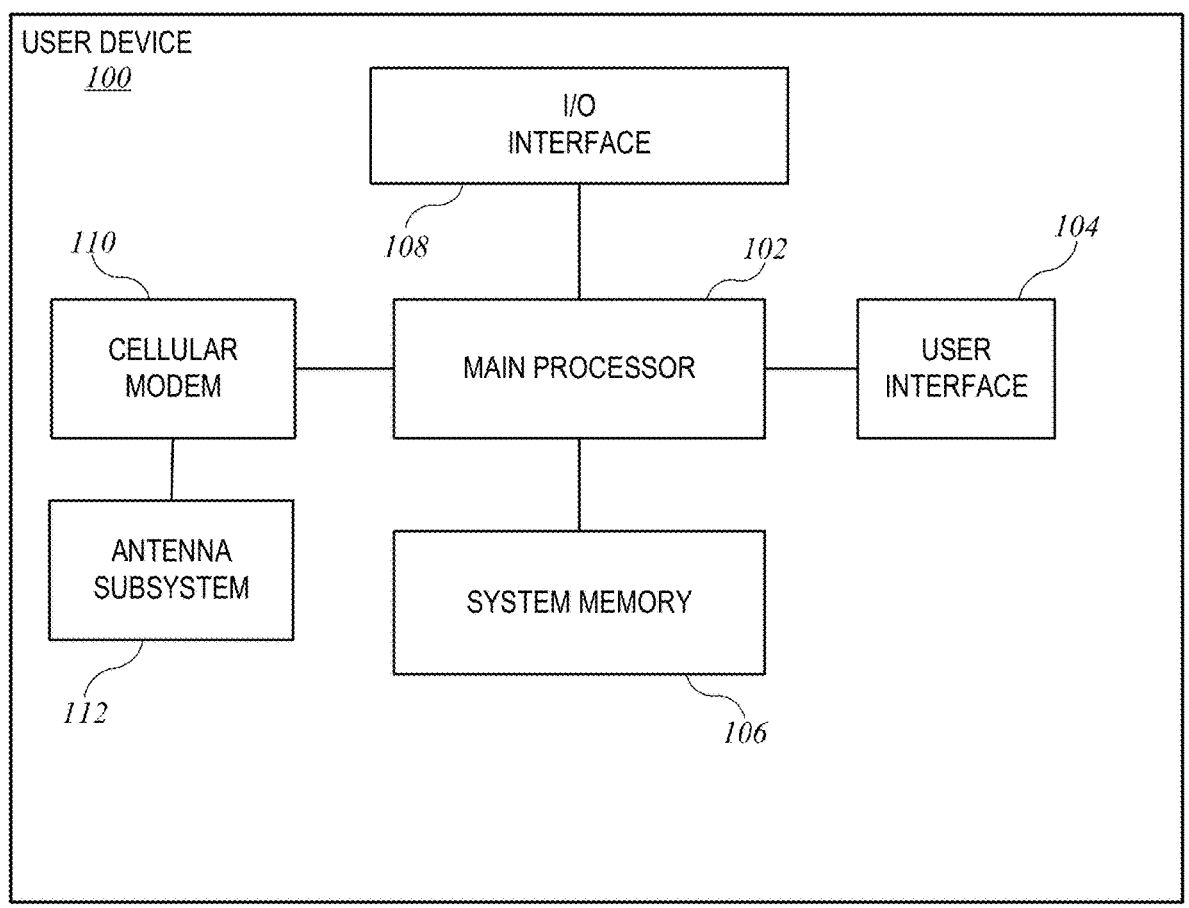
FIG. 1 is a simplified block diagram of a user device according to some embodiments.

FIG. 1 is a simplified block diagram of a user device 100 according to some embodiments. User device 100 can be, for example, a mobile device such as a smartphone, tablet computer, laptop computer, wearable device, or any other electronic device capable of operating as user equipment (UE) in a cellular radio access network. User device 100 is representative of a broad class of user-operable devices that may incorporate a cellular modem as described herein, and such devices can vary widely in capability, complexity, and form factor.

Main processor 102 can include, e.g., one or more single-core or multi-core microprocessors and/or microcontrollers executing program code to perform various functions associated with user device 100. For example, main processor 102 can execute an operating system and one or more application programs compatible with the operating system. In some instances, the program code may include instructions to send information to and/or receive information from other devices or systems, e.g., via a cellular data network such as a 4G or 5G network.

User interface 104 can include user-operable input components such as a touch pad, touch screen, scroll wheel, click wheel, dial, button, switch, keypad, keyboard, microphone, or the like, as well as output components such as a video screen, indicator lights, speakers, headphone jacks, haptic motors, or the like, together with supporting electronics (e.g., digital-to-analog or analog-to-digital converters, signal processors, or the like). Depending on the implementation of a particular user device 100, a user can operate input components of user interface 104 to invoke functionality of user device 100 and/or receive output from user device 100 via output components of user interface 104. In some embodiments, user device 100 may have a limited user interface (e.g., a small number of indicator lights and/or buttons) or no user interface.

System memory 106 can incorporate any type and combination of data storage media, including but not limited to random-access memory (e.g., DRAM, SRAM), flash memory, magnetic disk, optical storage media, or any other non-transitory storage medium, or a combination of media, and can include volatile and/or non-volatile media. System memory 106 can be used to store program code to be executed by main processor 102 and any other data or instructions that may be generated and/or used in the operation of user device 100.

Input/output (I/O) interface 108 can include hardware components and supporting software configured to allow user device 100 to communicate with other devices via point-to-point or local area network links. In some embodiments, I/O interface 108 can support short-range wireless communication (e.g., via Wi-Fi, Bluetooth, or other wireless transports) and can include appropriate transceiver and signal processing circuitry and software or firmware to control operation of the circuitry. Additionally or instead, in some embodiments, I/O interface 108 can support a wired connection to another device.

To enable communication via cellular networks, including cellular data communication, user device 100 can include a cellular modem 110 coupled to an antenna subsystem 112. Cellular modem 110 can be implemented as a microprocessor or microcontroller that acts as a co-processor to main processor 102. In some embodiments, cellular modem 110 and main processor 102 can be implemented as integrated circuits fabricated on a common substrate, e.g., as part of a system-on-a-chip design. Example implementations of cellular modem 110 are described below.

Antenna subsystem 112 can include an antenna, which can be implemented using a wire, metal traces, or any other structure capable of radiating radio-frequency (RF) electromagnetic fields and responding to RF electromagnetic fields at frequencies used in cellular data communication. For instance, 4G and 5G networks currently use various spectrum bands, including bands at 700 MHZ, 850 MHz, 900 MHz, 1.5 GHZ, 1.8 GHZ, 2.1 GHZ, 2.5 GHz and 3.5 GHZ. Antenna subsystem 112 can also include circuitry to drive the antenna and circuitry to generate digital signals in response to received RF signals. A particular antenna implementation is not critical to understanding the present disclosure, and those skilled in the art will know of numerous implementations. In some embodiments, antenna subsystem 112 can be shared between cellular modem 110 and I/O interface 108; for instance, the same antenna can be used to support any combination of cellular, Wi-Fi, and/or Bluetooth communications.

User device 100 can also include other components not shown in FIG. 1. For example, in various embodiments, user device 100 can include one or more data storage devices using fixed or removable storage media; a global positioning system (GPS) and/or other global navigation satellite system (GNSS) receiver; a camera; a microphone; a speaker; a power supply (e.g., a battery); power management circuitry; any number of environmental sensors (e.g., temperature sensor, pressure sensor, accelerometer, chemical sensor, optical sensor, etc.); and so on. Accordingly, user device 100 can provide a variety of functions, some or all of which may be enhanced by or reliant on cellular data communication supported by cellular modem 110.

Figure 2:
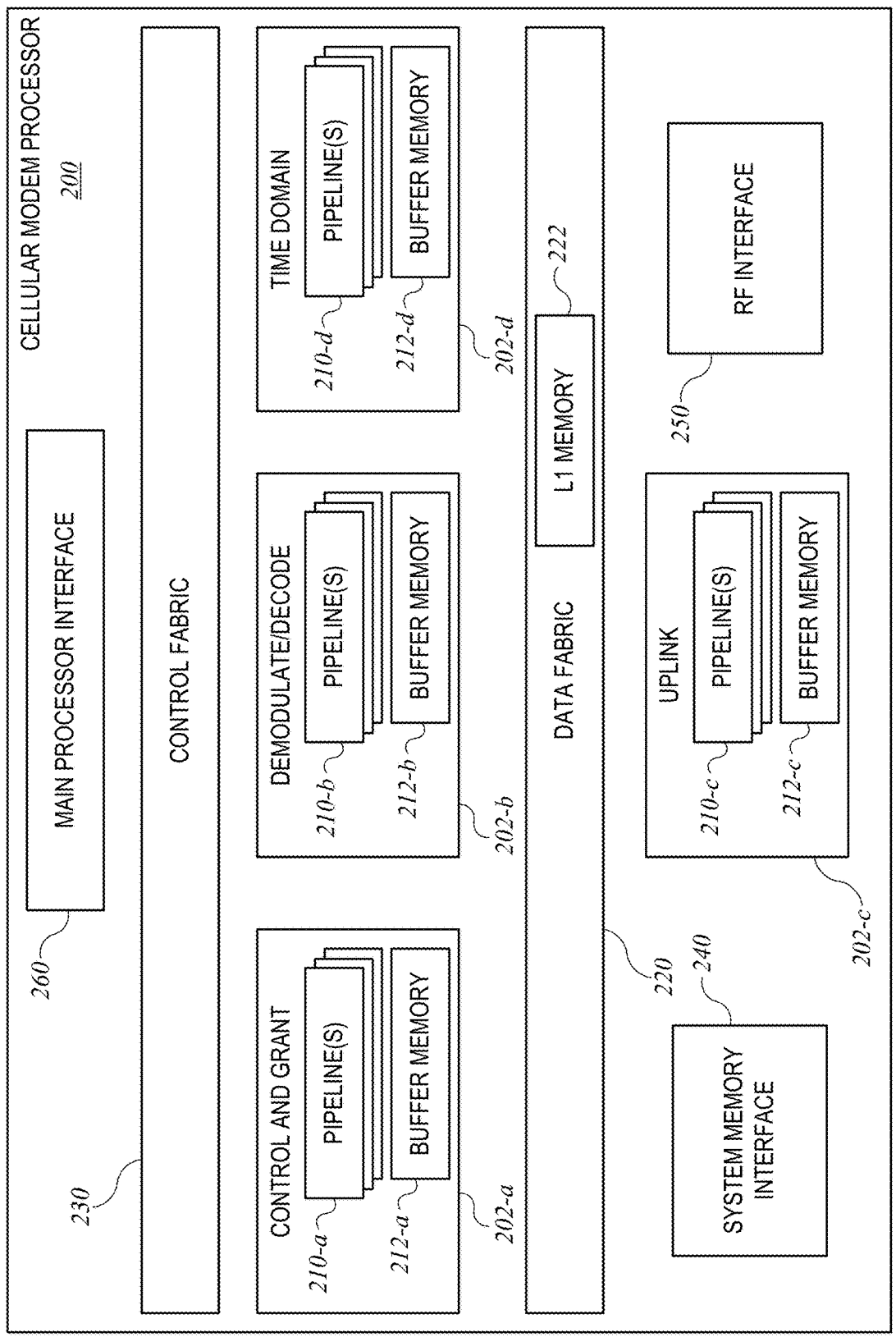
FIG. 2 is a simplified block diagram of a cellular modem processor according to some embodiments.

FIG. 2 is a simplified block diagram of a cellular modem processor 200 according to some embodiments. Cellular modem processor 200 can implement all or part of cellular modem 110 of FIG. 1. In various embodiments, cellular modem processor 200 can operate as user equipment (UE) in a cellular radio access network such as a 4G network and/or a 5G network.

Signal processing capabilities of cellular modem processor 200 can be implemented in various processing clusters 202. Each processing cluster 202 can include one or more pipelines 210 and dedicated buffer memory 212 (e.g., SRAM). Portions of buffer memory 212 can be allocated to each pipeline 210 with the processing cluster 202, so that different pipelines 210 need not share buffers. Each pipeline 210 can implement a particular sequence of operations associated with cellular data communication. For example, control and grant cluster 202-*a* can implement one or more pipelines 210-*a* for physical downlink control channel (PDCCH) processing for 4G and/or 5G networks. Information extracted from the control channel can be provided to other clusters, e.g., via data fabric 220. Demodulate/Decode (DMDC) cluster 202-*b* can implement one or more pipelines 210-*b* for physical downlink shared channel (PDSCH) processing for 4G and/or 5G networks. Uplink cluster 202-*c* can implement one or more pipelines 210-*c* for physical uplink control channel (PUCCH) processing and physical uplink shared channel (PUSCH) processing for 4G and/or 5G networks. Pipelines in control and grant cluster 202-*a*, DMDC cluster 202-*b*, and uplink cluster 202-*c* can operate in the frequency domain. Time domain cluster 202-*d* can implement one or more pipelines 210-*d* for conversion between time domain and frequency domain, which can include Fourier transforms and inverse Fourier transforms (e.g., using Fast Fourier Transform (FFT) or other discrete Fourier transform (DFT) algorithms).

Each pipeline 210 includes dedicated logic circuitry that implements a specific sequence of operations. The operations can conform to the specifications of a particular cellular data network, including 4G and/or 5G networks. For example, a PDSCH pipeline 210-*b* in DMDC cluster 202-*b* can implement frequency-domain signal processing operations for a 4G PDSCH channel, including orthogonal frequency division multiplexing (OFDM) symbol demapping, descrambling, de-interleaving, rate recovery, decoding using a Turbo decoder, and error detection and correction. Similarly, a separate PDSCH pipeline 210-*b* in DMDC cluster 202-*b* can implement frequency-domain signal processing operations for a 5G PDSCH channel, including descrambling, de-interleaving and rate recovery, decoding using a low-density parity check (LDPC) decoder, and error detection and correction. In some embodiments, at least one of PDSCH pipelines 210-*b* can be a configurable pipeline that handles both 4G and 5G PDSCH decoding. As another example, a PUCCH pipeline 210-*c* in uplink cluster 202-*c* can implement frequency-domain uplink processing for 4G PUCCH and PUSCH channels, including multiplexing of PUCCH and PUSCH data blocks. For example, a first pipeline can perform PUSCH encoding operations, including CRC (cyclic redundancy check) calculation, Turbo encoding, interleaving of encoded subblocks, and rate matching, while a second pipeline can perform PUCCH encoding operations, including CRC calculation, convolutional encoding, interleaving of encoded subblocks, and rate matching. A downstream pipeline can receive the rate-matched outputs of the first and second pipelines and multiplex the data into a single data stream for transmission, then scramble the data. The output can be mapped to a sequence of OFDM symbols for transmission. As these examples illustrate, each pipeline 210 can implement complex operations, and different pipelines 210 can implement disparate operations. In some instances, a cluster 202 can include multiple copies of the same pipeline 210, which can operate in parallel on different portions of a data stream to support higher throughput. Additionally or instead, a cluster 202 can include multiple different pipelines 210. For instance, in some embodiments, DMDC cluster 202-*b* can have one pipeline dedicated to 4G PDSCH processing and two copies of a shared pipeline that can be reconfigured for 4G or 5G PDSCH processing. Additional examples of pipelines and signal processing operations are described below.

As noted above, each pipeline 210 can have its own buffers 212 to store data as it progresses through the pipeline. To facilitate sharing of data between different pipelines 210 and different clusters 202, a data fabric 220 including a memory 222 local to cellular modem processor (referred to as "L1 memory") can be provided. Data fabric 220 can include memory circuits (e.g., SRAM, DRAM, or the like) implementing L1 memory 222, a read interface and a write interface connected via crossbars to clusters 202, and arbitration logic to manage multiple requests (e.g., using time division multiplexing or other techniques). In some embodiments, data fabric 220 can be implemented such that any cluster 202 can access any location in L1 memory 222. A particular memory or data fabric architecture is not critical to understanding the present disclosure, and a variety of architectures, including conventional architectures, can be used. In some embodiments, L1 memory 222 can be used to transfer data into and out of pipelines 210. For example, as described below, each pipeline 210 can include a first stage (or processing engine) that reads input data from L1 memory 222 and a final stage (or processing engine) that writes output data to L1 memory 222.

Control fabric 230 can include circuitry implementing communication between clusters 202 and/or between cellular modem processor 200 and other components of a device or system (e.g., user device 100 of FIG. 1) in which cellular modem processor 200 operates. For example, control fabric 230 can support messages from uplink cluster 202-*c* to time domain cluster 202-*d* indicating when uplink data is ready for conversion to time domain and transmission, messages from time domain cluster 202-*d* to DMDC cluster 202-*b* and/or control and grant cluster 202-*a* indicating when downlink data has been received and is ready for decoding. Any other messages or control signals to coordinate operations across different clusters or other components can be supported via control fabric 230. A particular control architecture is not critical to understanding the present disclosure, and a variety of architectures, including conventional architectures, can be used.

Cellular modem processor 200 can also include interfaces to other components of a system (e.g., user device 100 of FIG. 1) within which cellular modem processor 200 operates. For instance, a system memory interface 240 can provide a direct memory access (DMA) interface to transfer data between L1 memory 222 and system memory 106 of FIG. 1, including data for transmission via PUSCH and data received via PDSCH. RF interface 250 can transfer data to and from antenna subsystem 112 (e.g., as a digital data stream that is converted to or from an analog waveform by antenna subsystem 112). Main processor interface 260 can communicate with main processor 102, via an interface such as Advanced extensible Interface (AXI), which is part of ARM Advanced Microcontroller Bus Architecture or any other suitable interface for communication between a main processor and a coprocessor. System memory interface 240, RF interface 250, and main processor interface 260 can be coupled via control fabric 230 to other elements within cellular modem processor 200.

It will be appreciated that cellular modem processor 200 is illustrative and that variations and modifications are possible. A cellular modem processor can include any number and combination of clusters and pipelines, supporting any number and combination of cellular data communication standards. Data and control fabrics can be varied as desired. In some embodiments, cellular modem processor 200 can have a high throughput to support high-speed cellular networks (e.g., 12 Gbps for a 5G network).

To provide high throughput, a cellular modem processor can include a number of pipelines, where each pipeline can include a number of dedicated circuits configured to perform specific operations associated with data communication; examples include encoding, decoding, interleaving, rate matching, de-interleaving, de-rate-matching, computing cyclic redundancy check (CRC) bits, performing CRC, and so on. In some embodiments, some or all of the pipelines can be implemented using a general architectural framework that provides flexible (firmware-based) control with a data synchronization mechanism that is independent of the particular functionality of a pipeline or pipeline stage.

Figure 3:
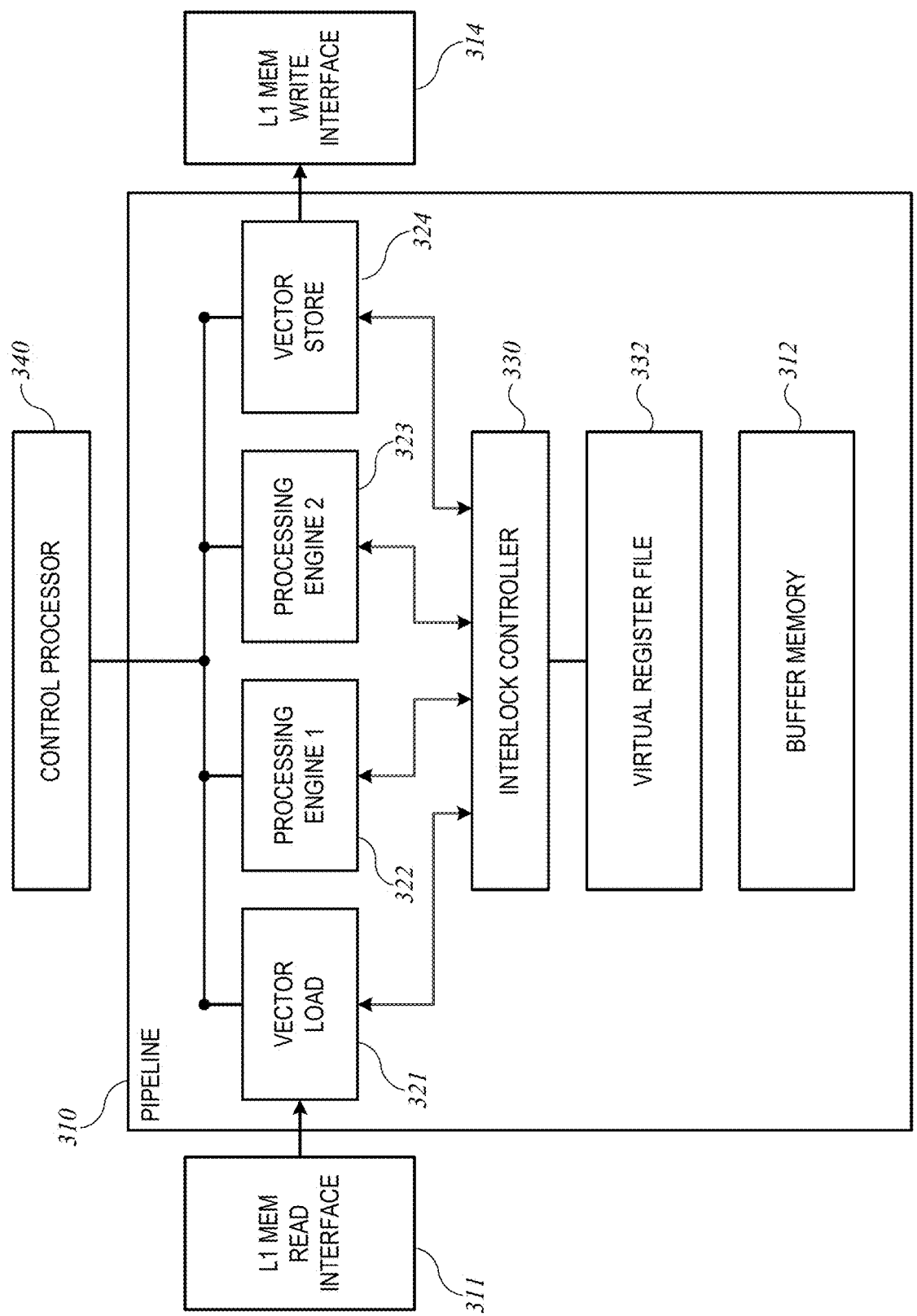
FIG. 3 shows a simplified block diagram of an architecture for a pipeline for a processor according to some embodiments.

FIG. 3 shows a simplified block diagram of an architecture for a pipeline 310 for a processor such as cellular modem processor 200 according to some embodiments. Pipeline 310 is presented as a generalized architectural model that can be used to provide data synchronization (or flow control) in a variety of signal processing or other data processing pipelines, including any or all of the pipelines 210 in cellular modem processor 200. In some embodiments, pipeline 310 can be a vector pipeline that can execute single-instruction multiple-data (SIMD) instructions to increase parallelism. Pipeline 310 includes a number of processing engines. In this example, the processing engines include vector load engine 321, two intermediate processing engines 322, 323, and a vector store engine 324. Vector load engine 321 communicates with a read interface 311 to read data stored in L1 memory (e.g., L1 memory 222 shown in FIG. 2) into a buffer memory 312 that is local to pipeline 310. In some embodiments, vector load engine 321 may also perform other operations on data read from L1 memory. For example, where pipeline 310 implements a PDSCH processing pipeline, vector load engine 321 may perform descrambling of data read from L1 memory prior to writing the data to buffer memory 312. Intermediate processing engine 322 can perform further operations on the data written to buffer memory 312 by vector load engine 321 and can write back the results of such operations to buffer memory 312. Similarly, intermediate processing engine 323 can perform further operations on the data written to buffer memory 312 by intermediate processing engine 322 and can write back the results of such operations to buffer memory 312. Although two intermediate processing engines are shown, it should be understood that any number of intermediate processing engines can be included in a pipeline. Vector store engine 324 can communicate with a write interface 314 to L1 memory (e.g., L1 memory 222 shown in FIG. 2). For example, vector store engine 324 can read the data written to buffer memory 312 by intermediate processing engine 323 (the last intermediate processing engine) and write the data to L1 memory. In some embodiments, vector store engine 324 may also perform other operations on data read from buffer memory 312 prior to writing the data to L1 memory. Each processing engine 321-324 can include logic circuits implementing specific functions related to cellular data processing. For example, in a PDSCH pipeline, the processing engines can include processing engines that perform descrambling, deinterleaving and rate recovery, decoding, and error detection and correction.

Processing engines 321-324 can operate as stages of a pipeline, with later stages operating on the output of earlier stages. Due to data dependencies between stages, processing engines 321-324 generally do not operate on the same data set at the same time. However, pipeline 310 can be operated as a multithreaded pipeline, in which different processing engines operate concurrently on different, independent data sets. For example, intermediate processing engine 322 can operate on a first data set while vector load engine 321 is loading a second data set. A thread can be defined corresponding to each data set. Each thread can have an associated context. For instance, for LDPC encoding, different threads can use different base graphs, code block sizes, etc. Each of processing engines 321-324 can include parameter registers that store parameter values defining the current context for that processing engine; when threads are switched, new parameter values can be loaded into the parameter registers.

Each processing engine 321-324 can implement a complex operation (e.g., LDPC decoding) that may take many clock cycles to complete. Operations implemented in different processing engines in the same pipeline may take different amounts of time to complete, and in some instances, an operation may take a variable amount of time, e.g., depending on parameter values of thread. Accordingly, pipeline 310 can benefit from data synchronization (or flow control) between processing engines 321-324 to ensure that data for a particular operation is written to buffer 312 by an upstream processing engine before a downstream processing engine attempts to read it.

According to some embodiments, data synchronization in a pipeline such as pipeline 310 can be provided using a combination of firmware-based control and a hardware-based interlock mechanism that can be independent of the particular operations implemented in the pipeline. For example, pipeline 310 can be controlled by a control processor 340. Control processor 340 can be, e.g., a scalar or superscalar microprocessor that implements an instruction set architecture (ISA) such as the x86 ISA originally developed by Intel and the related x86-64 ISA developed by AMD and Intel, ARM and AArch64 ISA from ARM Holdings, Power ISA and PowerPC ISA from IBM/Motorola, RISC-V or other ISA, including a customized ISA. Accordingly, control processor 340 can include conventional microprocessor components, such as an instruction memory and associated circuitry to fetch and decode instructions and to dispatch instructions to processing engines or functional units for execution. In some embodiments, control processor 340 can include functional units such as a general-purpose ALU, to which some instructions (e.g., add, compare, etc.) can be dispatched.

The ISA supported by control processor 340 can define a subset of instructions that control processor 340 dispatches to pipeline 310, e.g., to specific processing engines 321-324 of pipeline 310. For example, a specific instruction can be defined that is dispatched for execution by one of processing engines 321-324 in pipeline 310 for the purpose of performing an encoding process, such as LDPC encoding. The instructions dispatched to pipeline 310 can be vector (SIMD) instructions, regardless of whether control processor 340 is a vector processor. In some instances, the instructions dispatched to the pipeline can include context (thread-specific) parameters, such as address range(s) within buffer 312 for reading and/or writing data, as well as other parameters specifying aspects of the operation to be performed (e.g., rate-matching parameters, code block sizes for encoding or decoding, and so on). In addition or instead, the ISA can define parameter-setting instructions that provide some or all of the context parameters for a thread to pipeline 310.

Program code to be executed by control processor 340 can be provided as firmware. For instance, an instruction storage memory of control processor 340 can be loaded with code during installation or upgrading of a user device (e.g., user device 100), and control processor 340 can execute the firmware code.

The order of instructions in the program code can (implicitly) define data dependencies. For instance, if an instruction to write to a particular memory location in buffer memory 312 precedes an instruction to read from that location, a read-after-write dependency is defined. If an instruction to read from a particular memory location in buffer memory 312 precedes an instruction to write to that location, a write-after-read dependency is defined. If two different instructions specify writing to the same location in buffer memory 312, a write-after-write dependency is defined. If instructions having data dependencies are not executed in order relative to each other, the wrong data may be read, resulting in incorrect output data. In some embodiments, control processor 340 issues all instructions in-order, which can facilitate identifying data dependencies within pipeline 310. In some instances, a data dependency can exist between instructions to different processing engines 321-324. For instance, within a thread, processing engine 323 may operate on output data from processing engine 322, which involves a read-after-write dependency. Where data dependencies between processing engines exist, the later processing engine (e.g., processing engine 323) should wait to begin reading its input data until the earlier processing engine (e.g., processing engine 322) has finished writing its output data.

To manage data dependencies between processing engines 321-324, pipeline 310 can include an interlock controller 330. Interlock controller 330 can be a special-purpose logic circuit and can have associated memory that implements a virtual register file 332. For example, virtual register file 332 can be implemented using a lookup table or other addressable memory structure. (It should be understood that, as used herein, the term "virtual register file" refers to a physical memory structure. As described below, the physical memory structure can be used to store data dependency information based on references to virtual addresses.) As described below interlock controller 330 can use virtual register file 332 to track data dependencies and determine when data dependencies are cleared such that a particular processing engine can execute a particular instruction. For example, upon receipt of a dispatched instruction from control processor 340, any of processing engines 321-324 can send a read-lock request specifying an input address range (which can be defined in a virtual address space) and/or a write-lock request specifying an output address range (which can be defined in the same virtual address space) to interlock controller 330. Interlock controller 330 can update virtual register file 332 to establish the read-lock and write-lock on the specified addresses, e.g., by adding a read-lock or write-lock indicator to a list of locks associated with that address. Upon completion of an instruction (or a read or write operation associated with the instruction), the processing engine can send a clear-lock request specifying which read-lock or write-lock is to be cleared, and interlock controller 330 can update virtual register file 332 to clear the read-lock or write-lock. Prior to executing an instruction, processing engines 321-324 can poll interlock controller 330 using the relevant virtual addresses, and interlock controller 330 can respond with a "grant" signal if the polled virtual address is clear of data dependencies and a "deny" signal if not. Processing engines 321-324 can wait to execute the instruction (while continuing to poll interlock controller 330) until the grant signal is received from interlock controller 330. Accordingly, interlock controller 330 can provide data synchronization between processing engines 321-324 in pipeline 310.

It should be noted that operation of interlock controller 330 can be independent of the particular operations performed by any of the processing engines or how long a given operation might take. As long as each processing engine provides read-lock and write-lock requests on receipt of an instruction and defers execution until the grant signal is received, interlock controller 330 can manage the data dependencies.

Figure 4:
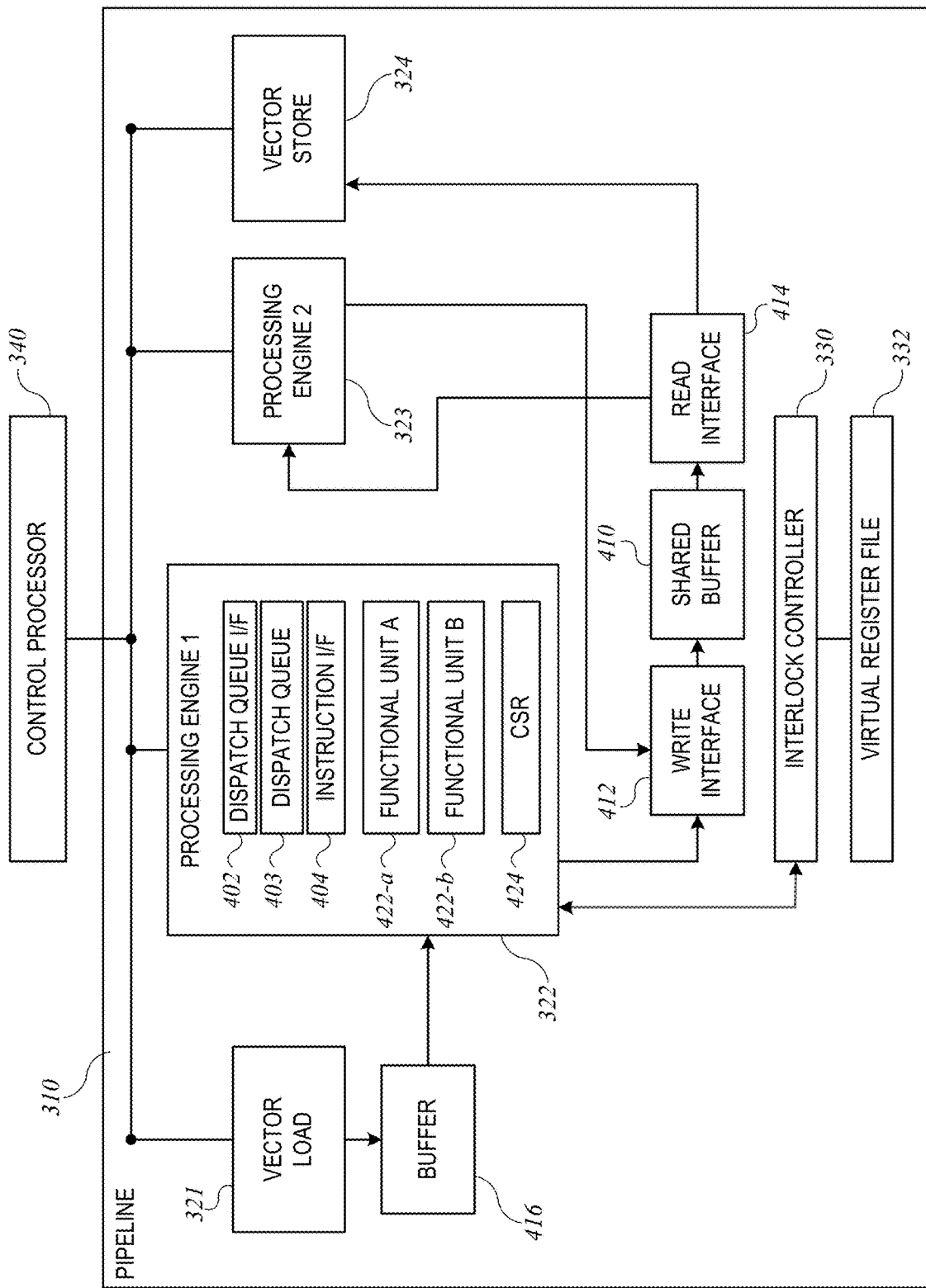
FIG. 4 shows a more detailed block diagram of the pipeline of FIG. 3 according to some embodiments.

In some embodiments, each processing engine 321-324 can use a uniform interface to communicate with control processor 340 and interlock controller 330. FIG. 4 shows a more detailed block diagram of pipeline 310 according to some embodiments. As described above, pipeline 310 includes a set of processing engines including vector load engine 321, intermediate processing engines 322-323, and vector store engine 324. Also shown in FIG. 4 are components of a representative processing engine 322. (It should be understood that other processing engines can include similar components.) Processing engine 322 can include a dispatch queue interface 402, a dispatch queue 403, an instruction interface 404, and one or more functional units 422 (two functional units 422-*a* and 422-*b* are shown; in general, a processing engine can have one or more functional units). Each functional unit 422 can be implemented as a vector (SIMD) functional unit that includes dedicated logic circuitry configured to execute an instruction (or operation) on multiple inputs in parallel. The instruction can be of arbitrary complexity. For example, a PDSCH processing pipeline that supports both 4G and 5G networks can include an instance of processing engine 322 that performs decoding. In this case, functional unit 422-*a* can implement Turbo decoding for 4G networks while functional unit 422-*b* implements LDPC decoding for 5G networks. Whether Turbo decoding or LDPC decoding is performed for a particular block of data can be determined by the instructions from control processor 340. For example, there can be a specific instruction that invokes functional unit 422-*a* and a different specific instruction that invokes functional unit 422-b. Each functional unit 422 can also include registers to store data during instruction execution and/or parameters that control the instruction execution. It should be understood that each functional unit 422 is a distinct physical circuit; different functional units 422 do not share components. Similarly, each processing engine 321-324 is a distinct physical circuit.

It should be understood that pipeline 310 and/or components thereof (e.g., processing engines 322) can include additional components. For example, processing engine 322 (or any processing engine in pipeline 310) can include control and status registers (CSRs) 424 that store information about received and/or executed instructions, data registers, and/or other internal registers that are not shared with other processing engines. In some embodiments, CSRs and/or other internal registers of a processing engine can be read or written by control processor 340. For example, control processor 340 can dispatch an instruction to a processing engine to read from or write to a particular CSR. In some embodiments, both blocking reads and non-blocking reads are supported. Register-read and register-write instructions can be queued in dispatch queue 403 by dispatch queue interface 402 and executed in order with other instructions to the same processing engine. In some embodiments, the internal registers of a processing engine (e.g., processing engine 322) are not shared between processing engines, and when a register-read or register-write instruction reaches the front of dispatch queue 403, it can be executed without polling interlock controller 330. In some embodiments, execution of the register-access instruction may wait until execution of any preceding instructions has completed. Vector status registers and vector flag registers can be implemented in a similar manner. Those skilled in the art with access to the present disclosure will be able to provide an appropriate set of status registers and/or flag registers and associated logic circuits to support execution of instructions using pipeline 310 and control processor 340. In various embodiments, any register that is shared between two or more processing engines can have a virtual address that allows interlock controller 330 to manage data dependencies for that register, while any register that is used by only one processing engine might or might not have a virtual address, depending on implementation.

As described above with reference to FIG. 3, data can be communicated between processing engines 321-324 using buffers 312 that are local to pipeline 310. In some instances, a buffer may be dedicated to a pair of successive processing engines in the pipeline. For example, FIG. 4 shows a dedicated buffer 416 to which vector load engine 321 writes data and from which intermediate processing engine 322 reads data. In other instances, a buffer may be shared by more than two processing engines in the pipeline. For example, FIG. 4 shows a shared buffer 410 having a write interface 412 and a read interface 414. Intermediate processing engines 322 and 323 each write data to shared buffer 410, and intermediate processing engine 323 and vector store engine 324 each read data from shared buffer 410. Write interface 412 and read interface 414 can implement crossbars and arbitration schemes such that any processing engine 321-324 (or any subset of processing engines 321-324) in pipeline 310 can read to or write from any location in shared buffer 410. Within a particular pipeline 310, any combination of shared buffers 410 and dedicated buffers 416 can be used, and within a given cellular modem processor (e.g., processor 200), different pipelines can have different configurations of buffers. A pipeline address space can be defined within each pipeline such that each location in buffers 416 and 410 (and/or any other buffers present in the pipeline) has a unique address. In some embodiments, the pipeline address space can be a virtual address space that translates, or maps, to physical locations in buffers 416, 410 via a simple operation (e.g., the virtual address can be a physical address with a buffer identifier prepended or the virtual address can be identical to the physical address); a variety of mappings between virtual and physical addresses can be used, provided that each virtual address maps to a different physical location in the buffer(s) of the pipeline. In some embodiments, the virtual address space can also include virtual addresses representing other locations in addition to buffers in the pipeline. For example, virtual addresses in the virtual address space can be defined for locations in L1 memory (or any shared memory) and/or for internal registers within a processing engine (e.g., any or all of processing engines 322) such as CSRs 424, internal data registers, or any other register or data storage location in pipeline 310.

Operation of functional units 422 can be controlled by dispatch queue interface 402, dispatch queue 403, and instruction interface 404. Dispatch queue interface 402 can receive instructions dispatched from control processor 340 for execution by processing engine 322. Dispatch queue 403 can be a memory structure, such as a FIFO buffer, that can maintain a queue of instructions received from control processor 340 until they can be executed (in order) by functional units 422. The depth of dispatch queue 403 is a matter of design choice, and in various embodiments, dispatch queue 403 can hold one, two, or more instructions. Dispatch queue interface 402 can also include circuitry to add instructions to dispatch queue 403 and additional circuitry to communicate with interlock controller 330 to send read-lock and write-lock requests as new instructions are received by dispatch queue interface 402. Instruction interface 404 can include circuitry to read the oldest instruction in dispatch queue 403, communicate with interlock controller 330 (e.g., by polling) to determine when data dependencies for the oldest instruction in dispatch queue 403 are satisfied, and launch the instruction in the appropriate functional unit 422 when data dependencies are satisfied. Examples of operation of dispatch queue interface 402 and instruction interface 404 are described below.

Figure 5:
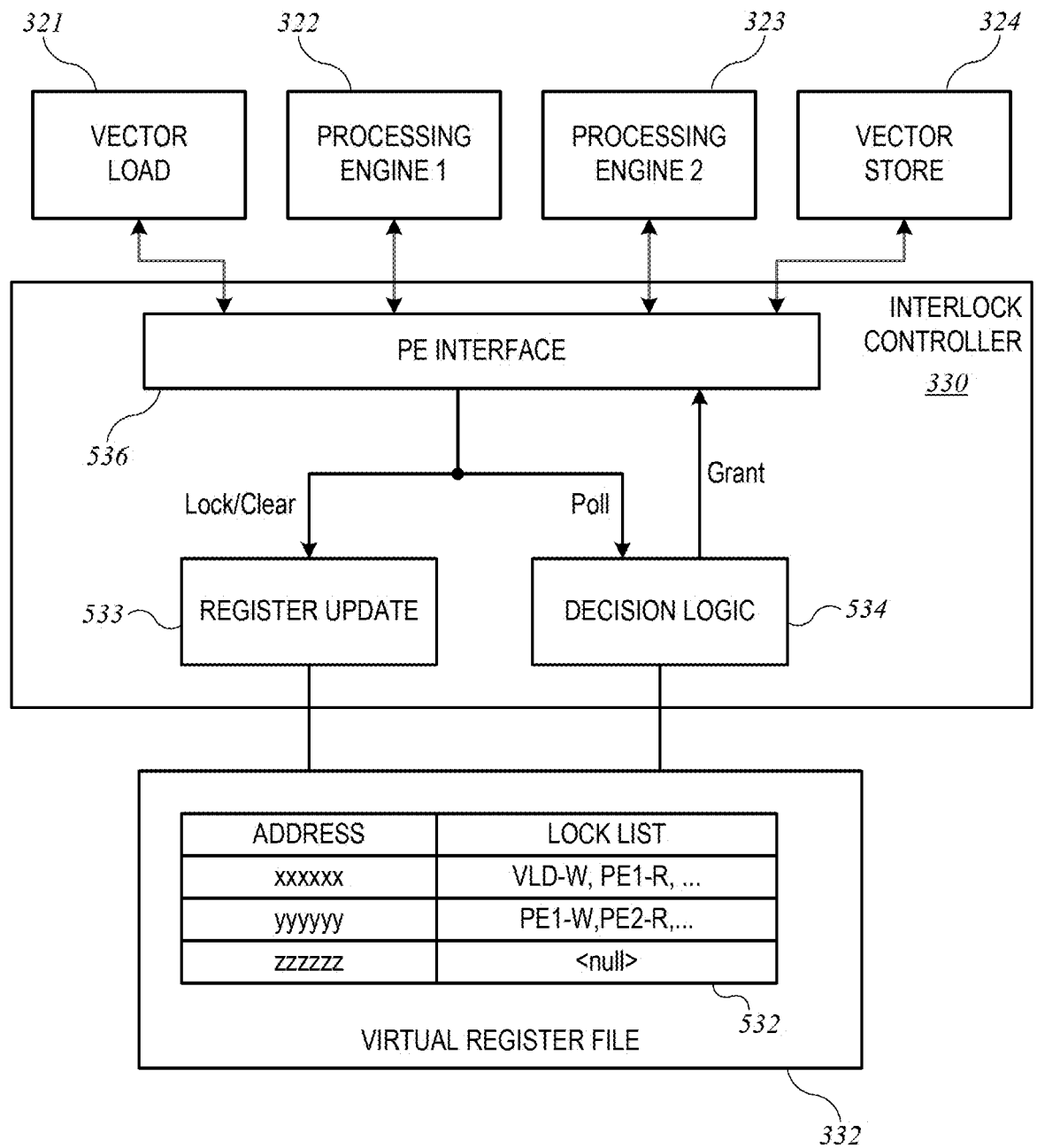
FIG. 5 is a simplified block diagram showing additional details of an interlock controller for a pipeline according to some embodiments.

Interlock controller 330 can receive and respond to requests from processing engines 321-324. FIG. 5 is a simplified block diagram showing additional details of interlock controller 330 according to some embodiments. Interlock controller 330 can include a register update circuit 533 and a decision logic circuit 534, as well as an interface 536 to processing engines 321-324. In this example, four processing engines are present. It should be understood that any number of processing engines can be included in a pipeline, and that all processing engines in the same pipeline can communicate with the same interlock controller. Interlock controller 330 can maintain a virtual register file 332. As shown in FIG. 5, virtual register file 332 can include a data structure 532 (e.g., a lookup table) that tracks the status of each address in the pipeline address space. For instance, for each address or range of addresses in the pipeline (virtual) address space, data structure 532 can store information indicating whether any read-lock and/or write-lock is currently established and if so by which processing engine(s). In some embodiments, data structure 532 can store a list associated with an address or range of addresses that lists, in order of receipt, all read-locks and write-locks that have been received and not cleared.

Via interface 536, interlock controller 330 can receive requests from processing engines 321-324, including "Lock," "Clear," and "Poll" requests, and can send responses to processing engines 321-324, including "Grant" and "Deny" responses. In some embodiments, "Lock" and "Clear" requests are handled by register update circuit 533, while "Poll" requests are handled by decision logic 534. For instance, register update circuit 533 can update the contents of data structure 532 in response to each "Lock" or "Clear" request. The "Lock" request can specify a virtual address range to be locked (as used herein, an "address range" can encompass any amount of memory, including a single address) and whether the lock is a read-lock or write-lock. A read-lock indicates that the processing engine will read from the buffer location(s) corresponding to the virtual address range, and a write-lock indicates that the processing engine will write to the buffer location(s) corresponding to the virtual address range. A "Clear" request indicates that a read-lock or write-lock can be cleared; the request can specify the address range and type of lock (read-lock or write-lock) to be cleared. As each request is received, register update circuit 533 can update data structure 532 accordingly. In some embodiments, register update circuit 533 can send an acknowledgement ("Ack") response to the processing engine after updating data structure 532.

It should be understood that the address ranges of different "Lock" and "Clear" requests from different processing engines can overlap without exactly coinciding. For example, different processing engines within a pipeline may operate on different-sized blocks or chunks of data. Thus, for instance, in pipeline 310 of FIGS. 3 and 4, vector load engine 321 may write-lock a large address range for a single instruction while intermediate processing engine 322 read-locks a subset of that address range for each instruction. In some embodiments, data structure 532 can have sufficient granularity to track the status of each address in the virtual address space; a coarser granularity (e.g., rows or pages) can be used if desired. In some embodiments, the granularity can be selected based on the smallest size of data blocks handled by the processing engines.

A "Poll" request can be sent by a processing engine when it is ready to execute the next instruction in its dispatch queue. Each "Poll" request can identify a virtual address range and an operation (read or write) to be performed. Decision logic 534 can read data structure 532 using the virtual address range to determine whether all data dependencies for that address range have been satisfied, based on presence or absence of read-locks and write-locks. A specific example of decision logic is described below. If all data dependencies have been satisfied, decision logic 432 can send a "Grant" response to the processing engine that sent the "Poll" request; if not, decision logic 432 can send a "Deny" response.

In some embodiments, each message from a processing engine can include the processing engine identifier; alternatively, each processing engine 321-324 can be connected to a different (physical) port of interface 536 (shown in FIG. 5), and the port identifier can be used to identify the processing engine. Other implementations are also possible, provided that virtual register file 332 indicates which addresses have read-lock and/or write-lock established, and by which processing engines.

In some embodiments, processing engine interface 536 can implement arbitration logic to prioritize requests that may be received on the same clock cycle. For example, arbitration logic can prioritize requests according to a sequence assigned to processing engines in the pipeline (e.g., an upstream processing engine can be prioritized over a downstream processing engine), or a round-robin prioritization logic can be used. In some embodiments, time-division multiplexing (TDM) can be used, with each processing engine being assigned certain clock cycles during which its requests to interlock controller 330 will be serviced. TDM can be implemented, e.g., by including timing logic in each processing engine to determine when the processing engine sends requests or by providing buffers in interface 536 to store requests from different processing engines and to select a next request in a round-robin fashion. A variety of arbitration schemes can be used.

It will be appreciated that pipeline 310 is illustrative and that variations and modifications are possible. Any number of processing engines can be included in a pipeline, and a processing engine can implement any operation, including operations related to 4G and/or 5G data processing. The virtual address space can be defined as desired. The dispatch queue of a processing engine can hold any number of entries (one or more), and dispatch queues of different processing engines can have different depths. A processing engine can include one or more functional units; where multiple functional units are present, each functional unit can have a different associated instruction.

In some embodiments, a processing engine can include multiple functional units that execute sequential operations, and the processing engine can include a hardware sequencer to control sequencing of the operations in different functional units. The hardware sequencer can include an instance of interlock controller 330 and virtual register file 332 that is local to one processing engine. In other words, any processing engine within a pipeline such as pipeline 310 can implement a "sub-pipeline," and multiple sub-pipelines can be present within a given pipeline. Where a processing engine implements a sub-pipeline, the control processor (e.g., control processor 340) can just dispatch an instruction for the sub-pipeline, and the processing engine can be configured to execute all stages of the sub-pipeline successively in response to the instruction.

Figure 6:
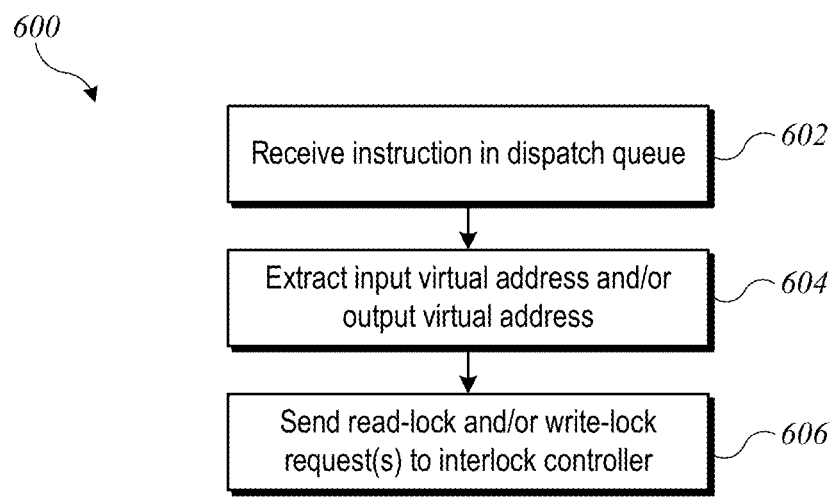
FIG. 6 shows a process that can be performed when an instruction is received into a processing engine according to some embodiments.
Figure 7:
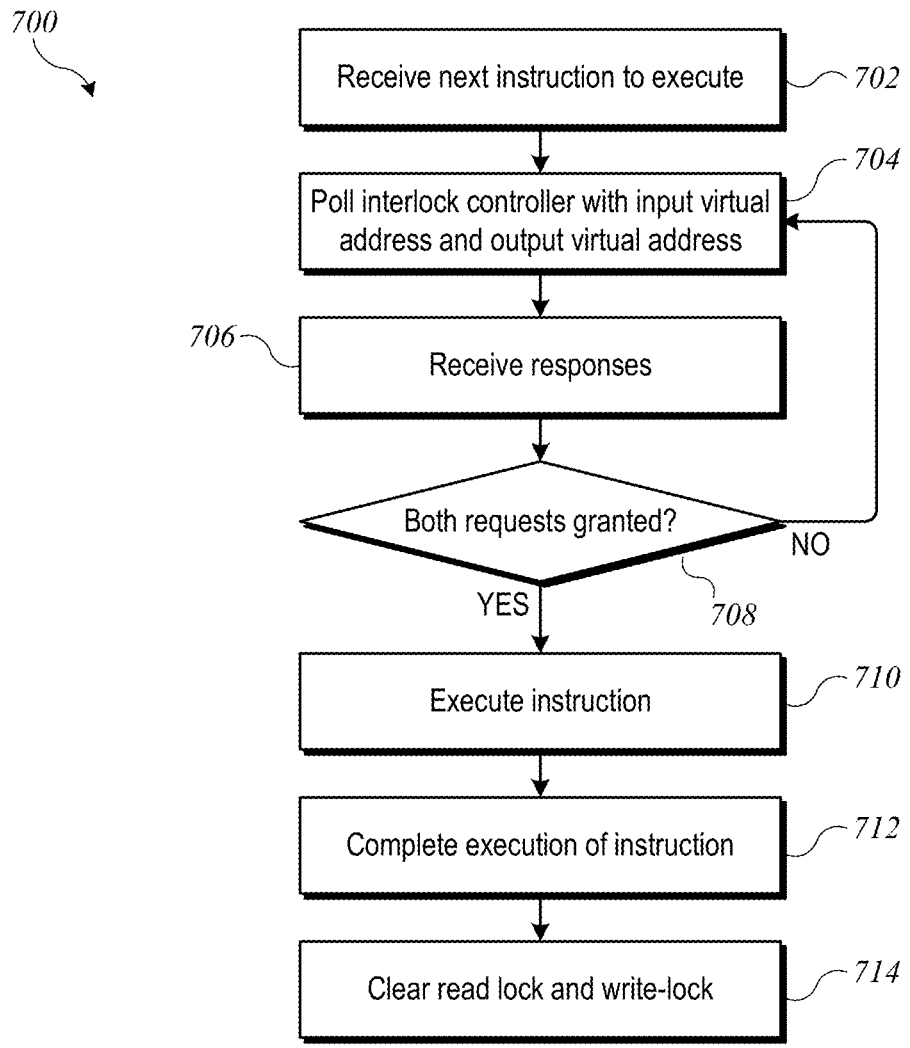
FIG. 7 shows a flow diagram of a process for executing an instruction in a processing engine according to some embodiments.
Figure 8:
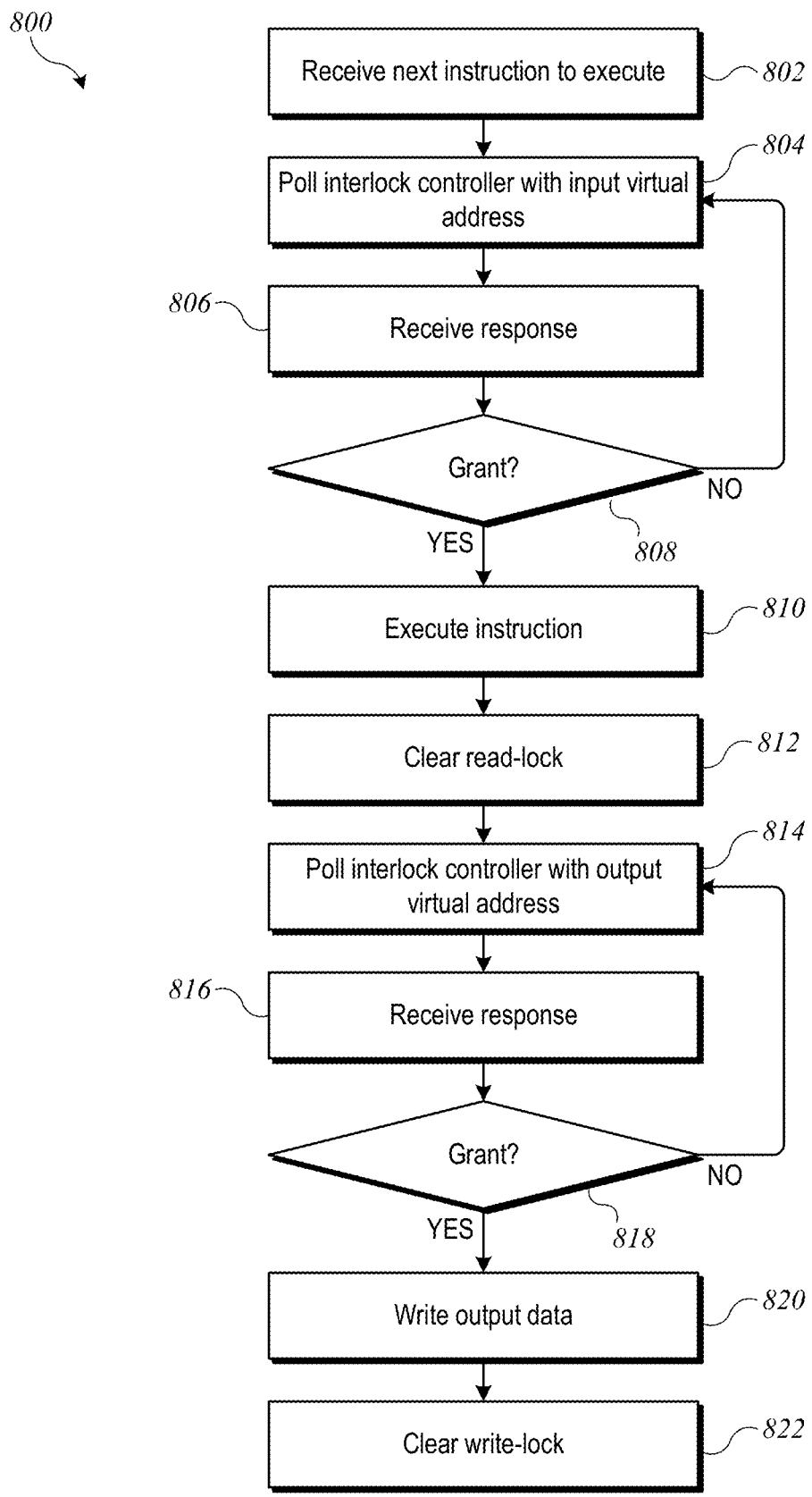
FIG. 8 shows a flow diagram of another process for executing an instruction in a processing engine according to some embodiments.

Examples of specific data synchronization operations that can be implemented within a pipeline (e.g., pipeline 310) using an interlock controller (e.g., interlock controller 330) will now be described. FIGS. 6, 7, and 8 show flow-control operations that can be implemented in each processing engine of a pipeline according to some embodiments. For instance, the operations shown can be implemented in each processing engine 321-324 of pipeline 310. FIG. 6 shows a process 600 that can be performed when an instruction is received by a processing engine according to some embodiments. Process 600 can be implemented, e.g., in dispatch queue interface 402 of each processing engine 321-324. At block 602, a new instruction is received at dispatch queue interface 402, e.g., from control processor 340 as described above. The new instruction can be added to dispatch queue 403 as it is received. At block 604, an input (read) virtual address range and an output (write) virtual address range can be extracted from the instruction. At block 606, a read-lock request for the input virtual address range and a write-lock request for the output virtual address range can be sent to interlock controller 330. Processing of the read-lock and write-lock requests by interlock controller 330 is described below. It should be understood that some instructions may result in generating only a read-lock request or only a write-lock request. For example, a "Load" instruction issued to vector load engine 321 can specify a read address range in the L1 memory space (which can be inside or outside the pipeline's virtual address space as desired) and a write virtual address that is in the pipeline's virtual address space; conversely, a vector-store instruction issued to vector store engine 324 can specify a read address range that is in the pipeline's virtual address space and a write address range in the L1 memory space (which, again, can be inside or outside the pipeline's virtual address space). In some embodiments, any input (or output) address that is outside the pipeline's buffers does not result in generating a read-lock (or write-lock) request. Thus, in some embodiments where the L1 memory space is not represented in the pipeline's virtual address space, a vector-load instruction can result in generating a write-lock request but not a read-lock request, while a vector-store instruction can result in generating a read-lock request but not a write-lock request. Where the L1 memory space is represented in the pipeline's virtual address space, a vector-load or vector-store instruction can generate both a read-lock request and a write-lock request. Where the L1 memory space is represented in the pipeline's virtual address space, the interlock controller can manage L1-memory data dependencies between instructions (e.g., load and store instructions) within the pipeline. As described above, L1 memory can be shared among multiple pipelines, and the L1 memory fabric can include additional features related to coordinating access requests across different pipelines.

After executing process 600, dispatch queue interface 402 can queue the instruction for execution (e.g., in dispatch queue 403) until all previously received instructions have been executed. At that point, instruction interface 404 can receive the instruction from dispatch queue 403 as the next instruction to be executed. FIG. 7 shows a flow diagram of a process 700 for executing an instruction in a processing engine (e.g., processing engine 322) according to some embodiments. At block 702, the next instruction to be executed can be received. For instance, instruction interface 404 can read the next instruction from dispatch queue 403. At block 704, the processing engine can poll the interlock controller to determine whether input data for the instruction is ready to be read and whether output data for the instruction can be safely written to the output buffer (e.g., buffer 410 or buffer 416 as the case may be). For example, processing engine 322 can send a first "Poll" request that includes the input virtual address range for the instruction and a second "Poll" request that includes the output virtual address range for the instruction to interlock controller 330. At block 706, the processing engine can receive a response to each polling request from the interlock controller. For example, interlock controller 330 can respond to each polling request with either a "Grant" or "Deny." If, at block 708, the response to one or both polling requests is not "Grant", process 700 can return to block 704 and poll the interlock controller again. In some embodiments, process 700 can wait one or more clock cycles before polling again. In some embodiments where processing engine 322 initially sends two "Poll" requests at block 704, if the response to one request is "Grant" and the response to the other request is "Deny," at the next iteration of block 704, process 700 can just send the poll request that has not yet been granted. In this manner, process 700 can continue to poll the interlock controller until the requests have been granted for both the input virtual address range and the output virtual address range.

If, at block 708, both requests have been granted, then at block 710, the processing engine can execute the instruction. For example, processing engine 322 can enable functional unit 422 to perform its operations. Once enabled, functional unit 422 can proceed to operate without further external control. Depending on the instruction and the implementation of functional unit 422, operations of functional unit 422 can include moving data from buffer locations identified by the input virtual address range into operand registers within functional unit 422, performing computations and/or logic operations, and/or moving data from the operand registers to buffer locations identified by the output virtual address range. In some embodiments, functional unit 422 may read a buffer location multiple times and/or write a buffer location multiple times. Since processing engine 322 maintains the read-lock and write-lock throughout execution, data in the locked buffers is not modified except by functional unit 422. At block 712, execution of the instruction can be completed, which can include, e.g., writing final output data for the instruction to buffer 416 (at locations corresponding to the output virtual address range).

At block 714, once execution is complete, the processing engine can send messages to the interlock controller to clear the read-lock for the input virtual address range and to clear the write-lock for the output virtual address range. For example, processing engine 322 can send a first "Clear" request to interlock controller 330 indicating that the read-lock for the input virtual address range should be cleared and a second "Clear" request to interlock controller 330 indicating that the write-lock for the output virtual address range should be cleared. In some embodiments, block 714 can occur after instruction execution is complete, which can include transferring output data from the registers within functional unit 422 to a buffer (e.g., buffer 410 or buffer 416 as the case may be).

Process 700 can be executed for each instruction in dispatch queue 403. In some embodiments, a processing engine performs process 700 for one instruction at a time, and process 700 for a second instruction can begin after execution of the first instruction is finished. Other implementations are also possible. For instance, in some embodiments, process 700 can begin for the second instruction while the first instruction is being executed at block 710. Depending on the implementation of the processing engine, if the polling requests for the second instruction are granted (block 708 results in "YES") before execution of the first instruction has finished, execution of the second instruction can begin (e.g., if it will not interfere with execution of the first instruction), or process 700 for the second instruction can wait to begin execution at block 710 until execution of the first instruction is completed. As described above, the instruction interface can be designed to issue instructions in order, in which case there is no benefit to polling the interlock controller for any instruction other than the instruction that is next to be executed. Different processing engines in a pipeline can perform process 700 independently of each other to process instructions in their respective dispatch queues. (Thus, instructions dispatched to different processing engines may execute out of order with respect to each other if data dependencies permit.)

In process 700, instruction execution begins only after both the read and write polling requests are granted, and the processing engine maintains the read-lock and write-lock for the instruction execution is complete. In some embodiments, it may be desirable to manage the read-locks and write-locks with finer granularity. By way of example, FIG. 8 shows a flow diagram of another process 800 for executing an instruction in a processing engine (e.g., processing engine 322) according to some embodiments. Process 800 can be generally similar to process 700. At block 802, the next instruction to be executed can be received. For instance, instruction interface 404 can read the next instruction from dispatch queue 403. At block 804, the processing engine can poll the interlock controller to determine whether input data for the instruction is ready to be read. For example, processing engine 322 can send a "Poll" request that includes the input virtual address range for the instruction to interlock controller 330. At block 806, the processing engine can receive a response from the interlock controller. For example, interlock controller 330 can respond with either a "Grant" or "Deny." If, at block 808, the response is "Deny" (or not "Grant"), process 800 can return to block 804 and poll the interlock controller again. In some embodiments, process 800 can wait one or more clock cycles before polling again.

If, at block 808, the response is "Grant," then at block 810, the processing engine can begin to execute the instruction. For example, processing engine 322 can read the input data from buffer 416 (at locations corresponding to the input virtual address range) into input registers of the appropriate functional unit 422 and enable functional unit 422 to perform its operations. Once enabled, functional unit 422 can proceed to generate output data without further external control. The output data can be temporarily stored in registers within functional unit 422.

At block 812, the processing engine can send a message to the interlock controller to clear the read-lock for the input virtual address range. For example, processing engine 322 can send a "Clear" request to interlock controller 330 indicating that the read-lock for the input virtual address range should be cleared. In various embodiments, block 812 can occur at any time after reading of all input data for the instruction from the input buffer by functional unit 422 is completed, including after instruction execution is completed.

At block 814, the processing engine can begin to poll the interlock controller to determine whether output data for the instruction can be safely written to the output buffer (e.g., buffer 410 or buffer 416 as the case may be). For example, processing engine 322 can send a "Poll" request that includes the output virtual address range for the instruction to interlock controller 330. In some embodiments, block 814 can occur at any point before functional unit 422 begins to write any data to the output buffer. For example, if functional unit 422 operates to produce a set of output data in local registers of processing engine 322, the output data can be held in the local registers until processing engine 322 determines that the output data can be written to the output buffer. At block 816, the processing engine can receive a response from the interlock controller. For example, interlock controller 330 can respond with either a "Grant" or "Deny." If, at block 818, the response is "Deny" (or not "Grant"), process 800 can return to block 814 and poll the interlock controller again. In some embodiments, process 800 can wait one or more clock cycles before polling again. If, at block 818, the response is "Grant," then at block 820, the processing engine can write the output data from the registers of the functional unit to the appropriate buffer. For example, processing engine 322 can write output data from registers of functional unit 422 to shared buffer 410. At block 822, after writing the output data, the processing engine can clear the write-lock. For example, processing engine 322 can send a "Clear" message to interlock controller 330 indicating that the write-lock for the output virtual address range should be cleared. Thereafter, process 800 can be repeated for the next instruction in dispatch queue 403.

As processes 700 and 800 illustrate, the point at which a processing engine begins polling the interlock controller for the virtual input address and/or virtual output address can be varied. Polling for both the virtual input address and the virtual output address prior to beginning execution (as in process 700) can simplify the logic and can be particularly appropriate in instances where executing the instruction can involve a series of read and/or write operations targeting a virtual address or range of virtual addresses. Similarly, the point at which a processing engine clears a read-lock and/or a write-lock can be varied. Clearing a read-lock (or write-lock) as soon as the last read operation (or write operation) that occurs during execution of an instruction can help to reduce wait times for subsequent instructions, but for some types of instructions, e.g., instructions where execution involves multiple read-modify-write operations, waiting until the end of the instruction may be desirable.

Figure 9:
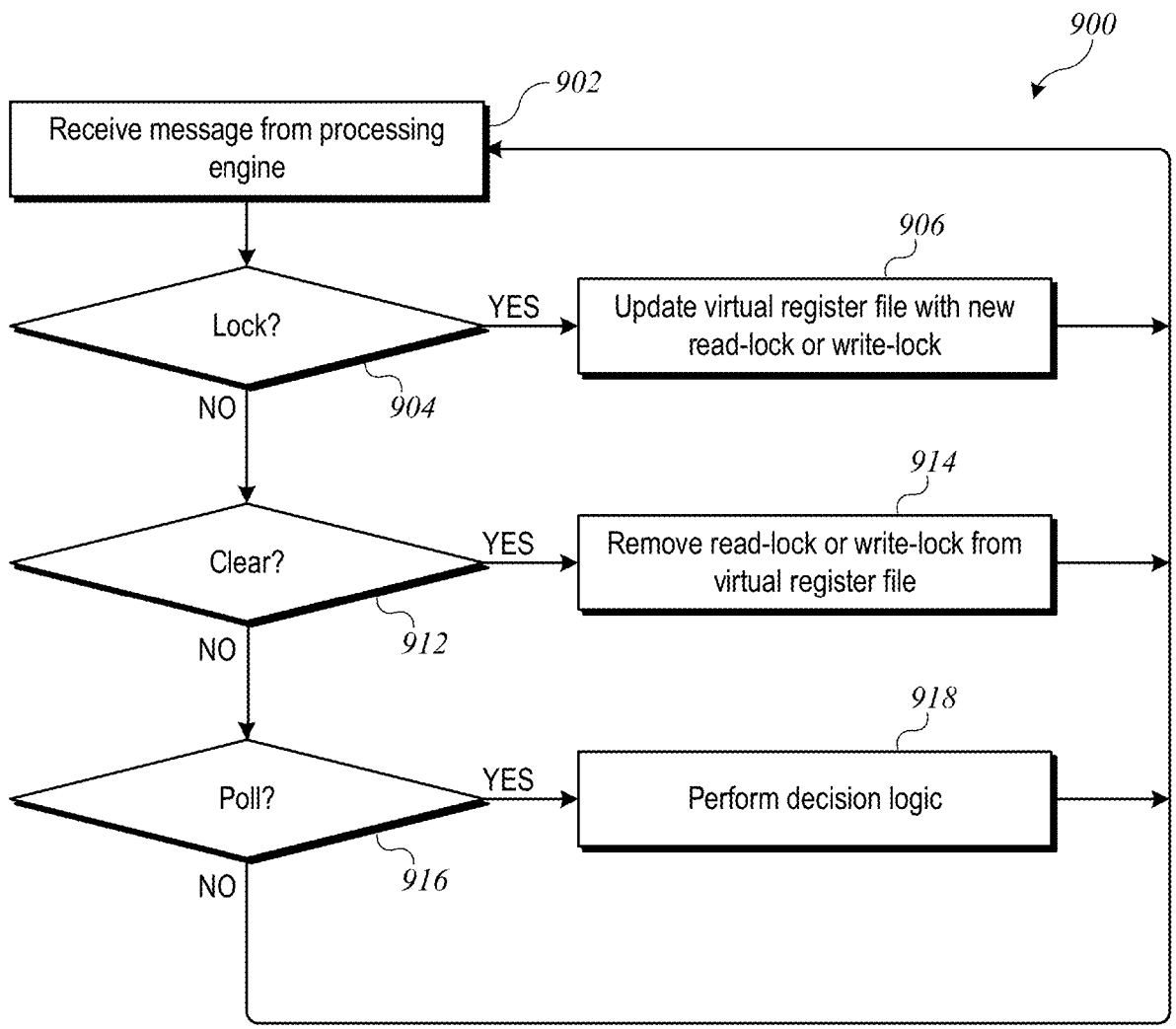
FIG. 9 shows a flow diagram of a process that can be performed by an interlock controller according to some embodiments.
Figure 10:
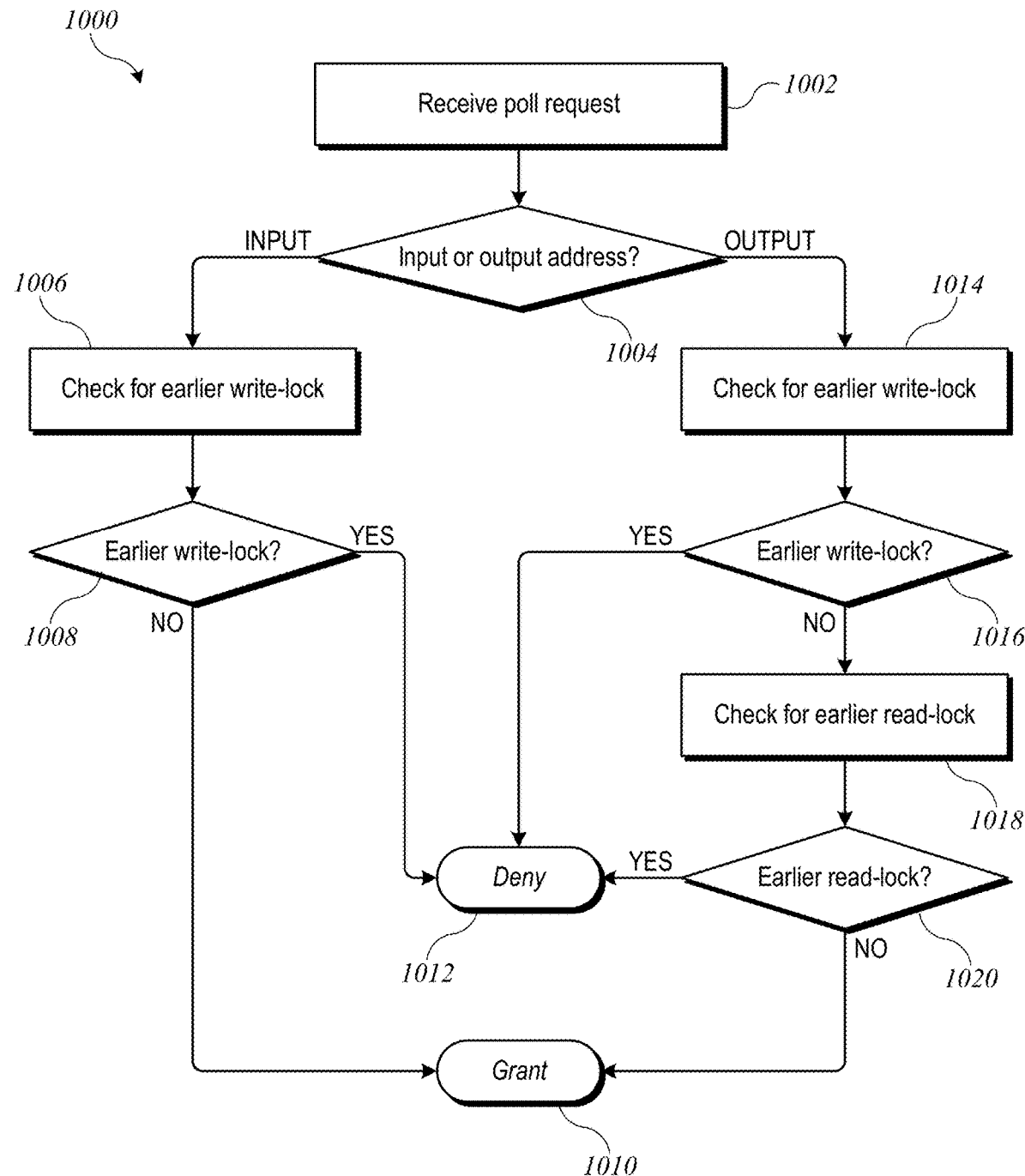
FIG. 10 is a flow diagram of a decision-logic process for an interlock controller according to some embodiments.

In processes 600, 700, and 800, an interlock controller (e.g., interlock controller 330) can receive "Lock" requests to establish read-lock or write-lock, "Clear" requests to remove previously established read-lock or write-lock, and "Poll" requests to query whether data dependencies for a particular read or write operation have been satisfied. FIGS. 9 and 10 are flow diagrams showing operation of an interlock controller such as interlock controller 330.

FIG. 9 shows a flow diagram of a process 900 that can be performed by an interlock controller (e.g., interlock controller 330) according to some embodiments. Process 900 can execute in a continuous loop as messages are received from the processing engines of a pipeline (e.g., pipeline 310). At block 902, a message is received from a processing engine. For example, messages can be received at processing engine interface 536 of interlock controller 330 as shown in FIG. 5. In some embodiments, block 902 can include arbitrating among multiple requests to select a request to process, e.g., as described above with reference to FIG. 5.

If, at block 904, the message is a Lock message, then at block 906, the interlock controller can update the virtual register file (VRF) by adding read-lock or write-lock information for the virtual address range specified in the read-lock or write-lock message. The particular information added can depend on the particular implementation of virtual register file 332 (e.g., data structure 532). For example, in some embodiments, when a read-lock or write-lock is requested by a particular processing engine (e.g., processing engine 322), interlock controller 330 can add an entry to a lock list associated with one or more addresses in the virtual address range specified in the message; the entry can include the identifier of the requesting processing engine and the type of lock (read-lock or write-lock). The list can be an ordered list that reflects the order in which lock requests are received.

If the message is not a Lock message, process 900 proceeds to block 912. If, at block 912, the message is a Clear message, then at block 914, the interlock controller can update the virtual register file by removing (clearing) the read-lock or write-lock information specified in the Clear message. For instance, if adding the read-lock or write-lock information is implemented by adding an entry to a lock list, then clearing the read-lock or write-lock information can be implemented by deleting that entry from the lock list. In some embodiments, the oldest entry having the same processing engine and address range as specified in the Clear message is deleted.

If the message is not a Lock message or a Clear message, process 900 proceeds to block 916. If, at block 916, the message is a Poll message, then at block 918, the interlock controller can invoke decision logic (e.g., decision logic 534) to generate a response (e.g., Grant or Deny), based on whether all relevant data dependencies reflected in the virtual register file have been satisfied. FIG. 10 is a flow diagram of a decision-logic process 1000 according to some embodiments. Process 1000 can be implemented, e.g., in decision logic 534 shown in FIG. 5, and can be performed at block 918 of process 900.

At block 1002, the decision logic can receive a poll request, which can include a virtual address range and an indication of whether the poll request is for an input (read) address range or an output (write) address range. If the poll request is for an input address range, the data dependencies of concern are read-after-write dependencies. If the poll request is for an output address range, then the data dependencies of concern include both write-after-read and write-after-write dependencies. At block 1004, if the poll request is for an input address range, process 1000 can proceed to block 1006. At block 1006, process 1000 can check for any write-lock on any address within the range that was established prior to the read-lock that corresponds to the poll request. In some embodiments, the read-lock that corresponds to the poll request can be recognized as the earliest read-lock for the address range of the poll request that was requested by the processing engine that made the poll request. For example, if virtual register file 332 stores a lock list for a virtual address or virtual address range, processing at block 1006 can include reading the lock list for each address in the input address range to determine whether any write-locks are present ahead of a read-lock associated with the processing engine that sent the poll request. An earlier write-lock indicates a read-after-write data dependency that should be cleared before the requesting processing engine begins to read. At block 1008, if any earlier write-lock exists, then the request should be denied and a "Deny" message can be sent at block 1012. If no earlier write-lock exists, then the request should be granted, and a "Grant" message can be sent at block 1010.

If, at block 1004, the poll request is for an output address range, process 1000 can proceed to block 1014. At block 1014, process 1000 can check for any write-lock on any address within the range that was established prior to the write-lock that corresponds to the poll instruction. In some embodiments, the write-lock that corresponds to the poll request can be recognized as the earliest write-lock for the address range of the poll request that was requested by the processing engine that made the poll request. For example, if virtual register file 332 stores a lock list for a virtual address or virtual address range, processing at block 1014 can include reading the lock list for each address in the input address range to determine whether any write-locks are present ahead of a write-lock associated with the processing engine that sent the poll request. An earlier write-lock indicates a write-after-write data dependency that should be cleared before the requesting processing engine begins to write. At block 1016, if any earlier write-lock exists, then the request should be denied and a "Deny" message can be sent at block 1012. If no earlier write-lock exists, then at block 1018, process 1000 can check for any read-lock on any address within the range that was established prior to the write-lock that corresponds to the poll instruction. In some embodiments, the write-lock that corresponds to the poll request can be recognized as the earliest write-lock for the address range of the poll request that was requested by the processing engine that made the poll request. For example, if virtual register file 332 stores a lock list for a virtual address or virtual address range, processing at block 1018 can include reading the lock list for each address in the input address range to determine whether any read-locks are present ahead of a write-lock associated with the processing engine that sent the poll request. An earlier read-lock indicates a write-after-read data dependency that should be cleared before the requesting processing engine begins to write. At block 1020, if any earlier read-lock exists, then the request should be denied and a "Deny" message can be sent at block 1012. If no earlier read-lock exists, then the request should be granted, and a "Grant" message can be sent at block 1010. Process 1000 can be performed each time a Poll request is received.

Referring again to FIG. 9, in some embodiments of process 900, any message that is not identified as a Lock, Clear, or Poll request can be ignored. In other embodiments, such messages may generate a response, e.g., a negative-acknowledgement ("Nack") indicating that the message was not processed.

It will be appreciated that the processes shown in FIGS. 6-10 are illustrative and that variations or modifications are possible. Order of operations can be modified to the extent that logic permits, operations described separately can be combined, and additional operations not specifically described can be included. For example, the particular point during instruction execution at which a processing engine clears a read-lock or write-lock can be modified, provided that the read-lock (write-lock) is not cleared until the processing engine has finished reading (writing) data from (to) the address range associated with the lock.

In some embodiments, a processing engine can clear a read-lock (or write-lock) for part of an address range. Such partial clearing of a lock may allow another processing engine to begin execution sooner; tradeoffs include more requests to be handled by interlock controller and additional logic in the processing engine to determine when partial clearing is safe.

In some embodiments polling can be replaced by a notification protocol in which the interlock controller determines which processing engines have instructions that are clear of data dependencies and notifies the processing engines without waiting to be polled. (A notification protocol, however, may require more complex decision logic in the interlock controller.) In some embodiments, a pipeline flush operation can be defined that clears all instructions from the dispatch queues and clears all read-locks and write-locks from the virtual register file.

Figure 11:
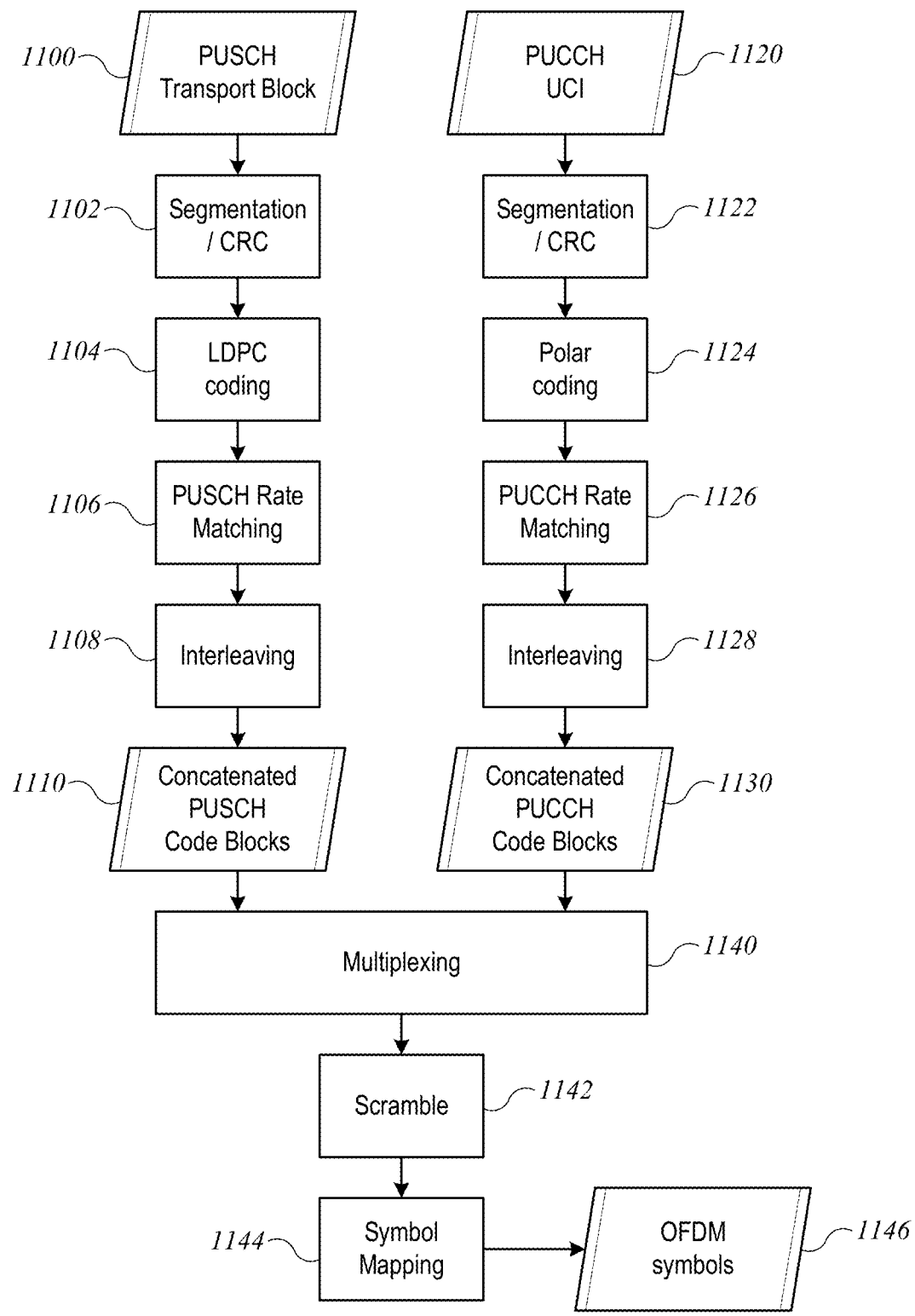
FIG. 11 shows a diagram of uplink frequency domain processing for 5G PUSCH and PUCCH that can be supported in some embodiments.

According to some embodiments, a pipeline for PUSCH and PUCCH encoding can be implemented using the pipeline architecture described above. PUSCH and PUCCH are used to transmit data (e.g., application-layer data) and uplink control information respectively. In both 4G and 5G specifications, PUSCH and PUCCH employ different channel coding, interleaving, and modulation schemes. PUSCH and PUCCH can be multiplexed together within OFDM symbols, with some component carriers assigned to PUCCH symbols and others assigned to PUSCH symbols. FIG. 11 shows a diagram of uplink frequency domain processing for 5G PUSCH and PUCCH that can be supported in some embodiments. For PUSCH, the UE (or other mobile station) can receive a transport block 1100 for PUSCH containing an arbitrary number of data bits to be transmitted. Cyclic redundancy check (CRC) bits are computed for the transport block and appended to the transport block. The transport block (including CRC) bits is segmented into code blocks, and each code block has additional CRC bits computed and appended (block 1102). Each code block is encoded using LDPC channel coding (block 1104). Rate matching (block 1106) is performed on the encoded code block, which generally entails repeating all or part of the encoded code block. Bit interleaving (block 1108) is performed on the rate-matched code block, resulting in concatenated PUSCH code blocks 1110. For PUCCH, the UE (or other mobile station) generates uplink control information (UCI) 1120 in one of several formats specified by the standard. Processing of UCI blocks depends on the size of the block and can include segmentation (if the block has more than 19 information bits) and appending CRC bits (block 1122), polar coding (block 1124) or other coding schemes for small blocks having fewer than 12 information bits, rate matching (block 1126), and interleaving (block 1128), resulting in concatenated PUCCH code blocks 1130. A multiplexing stage (block 1140) selects either PUSCH or PUCCH as a source of a symbol for each OFDM component carrier for every symbol period. (The number of component carriers can depend on the particular network configuration; current 5G standards specify up to 10 component carriers.) For each component carrier an appropriate number of bits is taken from either the PUSCH concatenated code blocks 1110 or the PUCCH concatenated blocks 1130, scrambled (block 1142) according to the scrambling bit sequence for PUSCH or PUCCH (as the case may be), and mapped (block 1144) onto a symbol 1146 in the appropriate constellation. As used herein, "constellation" refers to a diagrammatic representation of a signal modulated by a digital modulation scheme (e.g., 256QAM, QPSK, etc.). The appropriate constellation for each symbol is selected based on network configuration and the type of data being encoded. For instance, PUCCH may use QPSK, BPSK, or similar constellations suitable for smaller amounts of data while PUSCH may use larger constellations such as 16QAM or 256QAM.

Figure 12:
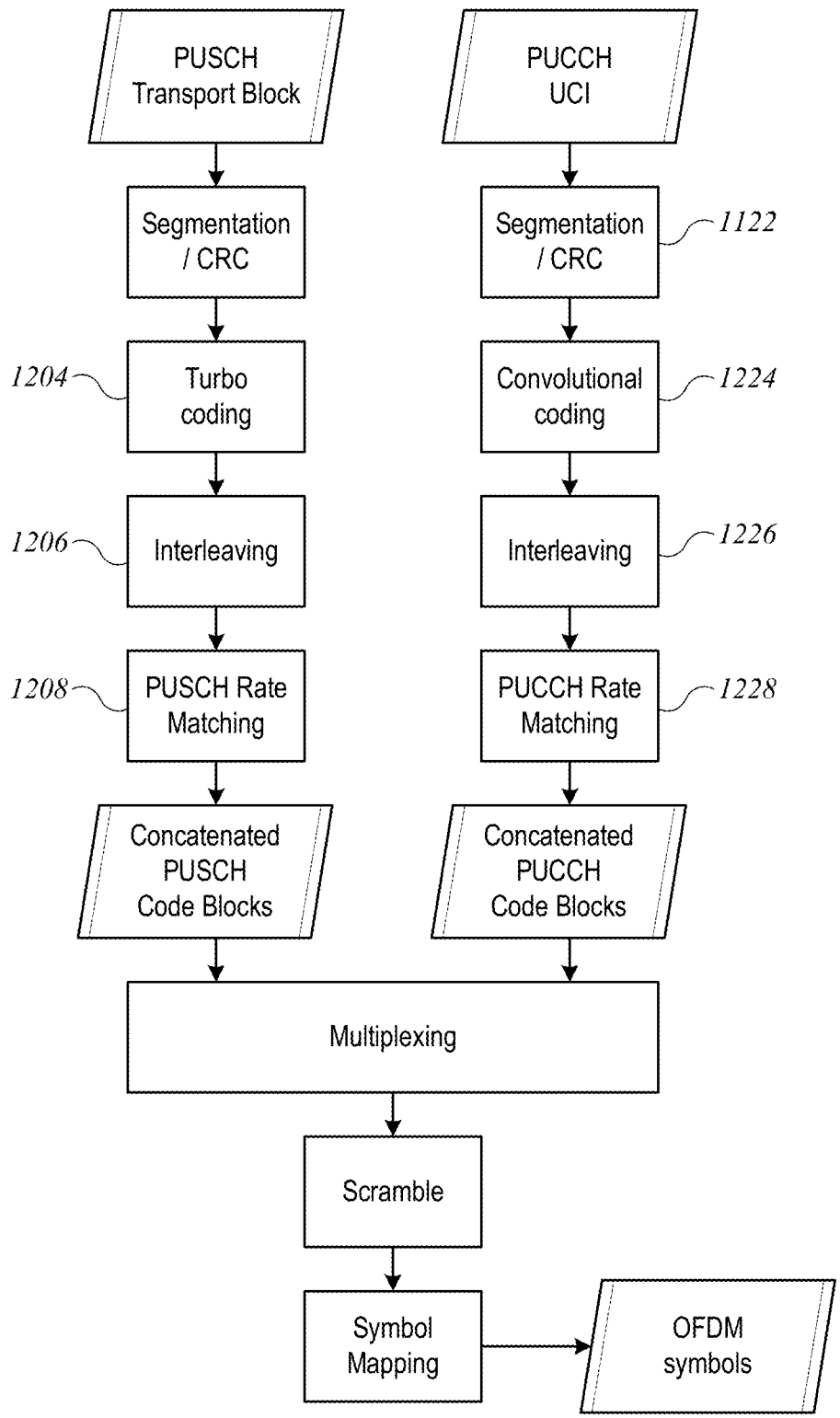
FIG. 12 shows a diagram of uplink frequency domain processing for 4G PUSCH and PUCCH that can be supported in some embodiments.

FIG. 12 shows a corresponding diagram of uplink frequency domain processing for 4G PUSCH and PUCCH. At a high level, the process is similar; however, there are implementation differences. For instance, 4G PUSCH uses Turbo coding (block 1204) rather than LDPC coding; the sequence of rate-matching (block 1208) and interleaving (block 1206) operations is reversed relative to 5G; and 4G PUCCH uses convolutional coding (block 1224) rather than polar coding for UCI code blocks.

The processes shown in FIGS. 11 and 12, including specific computations for each stage, are defined in the 4G and 5G standards. The standards, however, do not prescribe any particular hardware or software implementation of these processes. Among the challenges in designing a cellular modem processor is to implement such processes efficiently (in terms of hardware area and power consumption) and with sufficient throughput to support high data rates. For instance, it is desirable to provide symbols for all OFDM component carriers within a short time window (e.g., the duration of a symbol period) so that available transmission bandwidth can be efficiently used.

Some embodiments provide a multimode PUSCH/PUCCH encoding pipeline (also referred to herein as an "uplink pipeline") that can support both 4G and 5G data transmission (and/or other data transmission standards, or modes) in a flexible manner with high throughput. The uplink pipeline can leverage the architecture of the pipeline of FIG. 3 to provide dedicated hardware to implement the various operations in the encoding sequence and firmware to control the data flow, invoking appropriate operations to encode PUSCH and PUCCH code blocks and to multiplex the two streams for transmission. In embodiments described herein, the output of the uplink pipeline can be a set of symbols mapped to OFDM component carriers, with certain component carriers allocated to PUCCH and other component carriers allocated to PUSCH. In some embodiments, firmware executed in the control processor that controls the uplink pipeline can define threads to do various tasks including encoding of PUSCH data to generate concatenated code blocks (for 4G or 5G), encoding of PUCCH UCI to generate concatenated code blocks (for 4G or 5G), and selecting of bit groups from PUSCH and PUCCH in an appropriate sequence for mapping to symbols for the component carriers. The OFDM symbol mapper may be operated at a specific rate to provide OFDM symbols for each symbol period at the transmitter, and the firmware can sequence operations between the various threads so that code blocks representing PUSCH data and PUCCH UCI are reliably available to the OFDM symbol mapper, which can help to optimize transmission bandwidth utilization.

Figure 13:
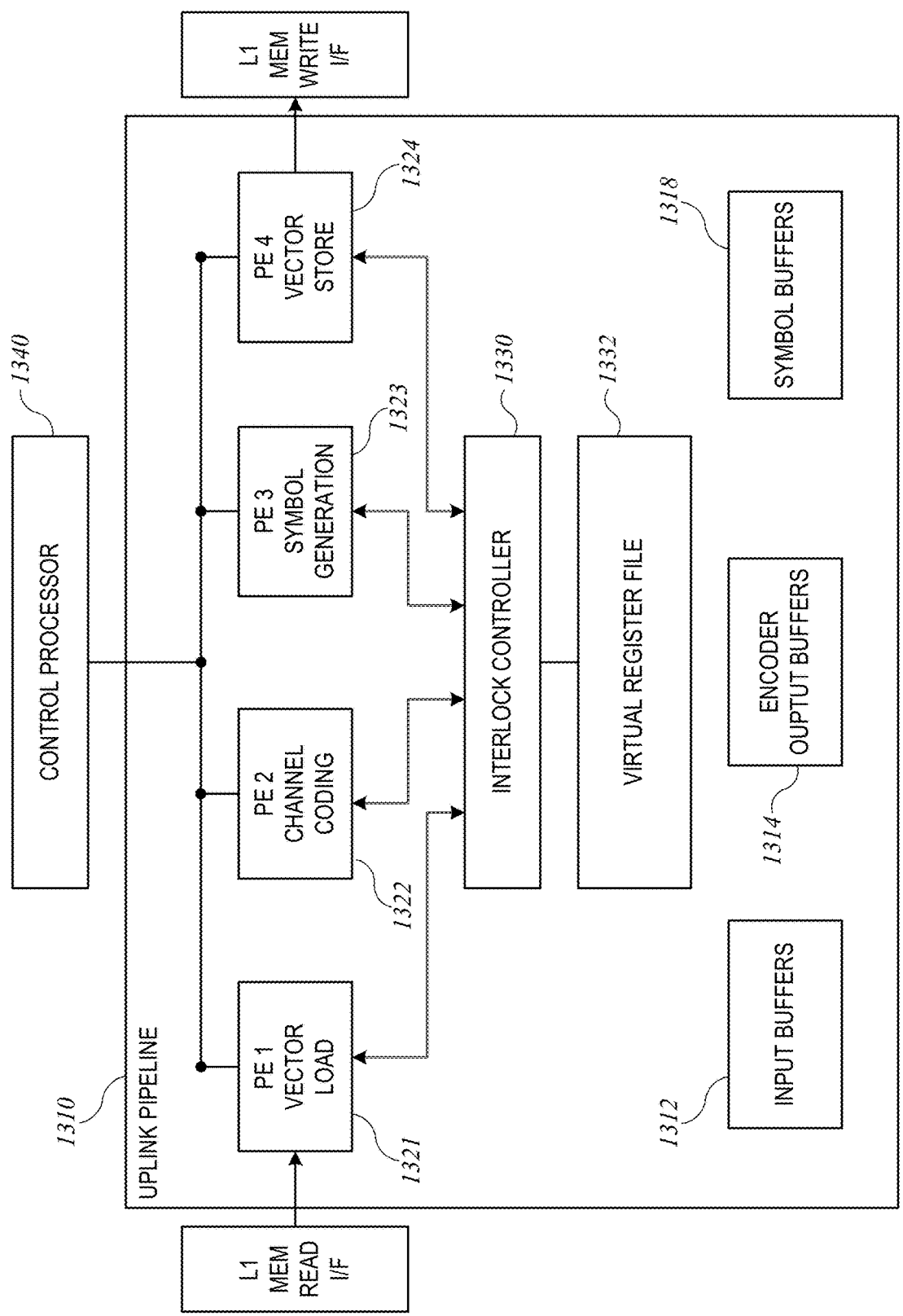
FIG. 13 shows a simplified high-level block diagram of an uplink pipeline according to some embodiments.

FIG. 13 shows a simplified high-level block diagram of an uplink pipeline 1310 according to some embodiments. Pipeline 1310 can be an instance of pipeline 310 described above. In this example, it is assumed that pipeline 1310 operates on code blocks. For PUSCH, a code block can contain data generated elsewhere in a user device (e.g., user device 100) and provided to a cellular modem processor (e.g., processor 200) for transmission. For PUCCH, a code block can contain uplink control information (UCI) in a format specified by the relevant communication standard. The manner in which PUSCH data and UCI are generated is not relevant to understanding this disclosure. Vector load engine 1321 and vector store engine 1324 can be similar to vector load engine 321 and vector store engine 324 described above. For PUSCH, vector load engine 1321 can load code blocks from L1 memory into input buffers 1312. In some embodiments, vector load engine 1321 can segment transport blocks in L1 memory to generate the code blocks, and segmentation can include computing and appending CRC bits to a transport block and/or to individual code blocks. In other embodiments, segmentation into code blocks can be performed by a component outside of pipeline 1310, and vector load engine 1321 can read the code blocks from L1 memory. For PUCCH, vector load engine 1321 can receive UCI from control processor 1340, e.g., via a register write instruction, and can write UCI code blocks to input buffers 1312. In some embodiments, control processor 1340 can segment the UCI into code blocks prior to providing the UCI to vector load engine 1321. In other embodiments, vector load engine 1321 can segment UCI into code blocks and write the code blocks to input buffers 1312. Other implementations are also possible. As described below, some embodiments can provide separate input buffers 1312 for data and UCI.

Processing engine 1322 can implement channel coding. As described below, processing engine 1322 can include different functional units that execute different channel coding instructions, and the particular channel coding instruction executed in processing engine 1322 can be specified on a per-code-block basis. In some embodiments, processing engine 1322 can implement LDPC coding, Turbo coding, polar coding, and tail-bite convolutional coding, with configurable parameters to support the various PUSCH and PUCCH channel coding options for both 4G and 5G. Regardless of the channel coding scheme, processing engine 1322 can output encoded code blocks to encoder output buffers 1314. In some embodiments separate encoder output buffers 1314 can be maintained for PUSCH data and PUCCH UCI code blocks, to facilitate multiplexing of the uplink channels.

Processing engine 1323 can implement OFDM symbol mapping for the uplink channels. In some embodiments, processing engine 1324 can include mapping circuitry that reads a group of bits from encoder output buffers 1314 and outputs a corresponding symbol (e.g., a complex number) representing the point in a symbol constellation that corresponds to the bits. In some embodiments, processing engine 1324 can support symbol mapping for a number of different constellations, and the correct constellation can be selected on a symbol-by-symbol basis in accordance with applicable network specifications. Processing engine 1323 can include additional circuitry to prepare bit groups for symbol mapping. For example, processing engine 1323 can include functional units to perform rate matching, interleaving, and scrambling in accordance with network specifications. Processing engine 1323 can write the output symbols to symbol buffers 1318. Different circuitry can be provided for different operating modes and channels. For instance, in 5G PUSCH, rate matching precedes interleaving, while for 4G PUSCH, interleaving precedes rate matching. Appropriate circuitry can be provided for each supported channel and mode to read bit code blocks from encoder output buffers 1314 and generate groups of bits ready to be mapped onto symbols. In some embodiments, rate matching and/or interleaving can be implemented in processing engine 1322 rather than processing engine 1323, and encoder output buffers 1314 can store concatenated PUSCH code blocks and concatenated PUCCH code blocks. It is noted that rate matching generally increases the number of bits per code block and storing rate-matched code blocks may entail a larger encoder output buffer 1314.)

Vector store engine 1324 can write OFDM symbols to L1 memory from symbol buffers 1318. (As used herein, an "OFDM symbol" can include one symbol for each OFDM component carrier.) Other techniques for transferring OFDM symbols to L1 memory can be used. For instance, in some embodiments, processing engine 1323 can be configured to write OFDM symbols directly to L1 memory. As another example, control processor 1340 can be configured to read the symbols from symbol buffers 1318, e.g., using a register read instruction. Via L1 memory, the OFDM symbols can be delivered to another pipeline (e.g., a pipeline 210-d in time domain cluster 202-d of processor 200 in FIG. 2) that uses the OFDM symbols to generate a time-domain modulation signal for an RF transmission.

Control processor 1340 and interlock controller 1330 can be similar or identical to control processor 340 and interlock controller 330 described above. As with other interlock controllers described herein, interlock controller 1330 can maintain a virtual register file 1332 to track data dependencies between processing engines 1321-1324.

Figure 14:
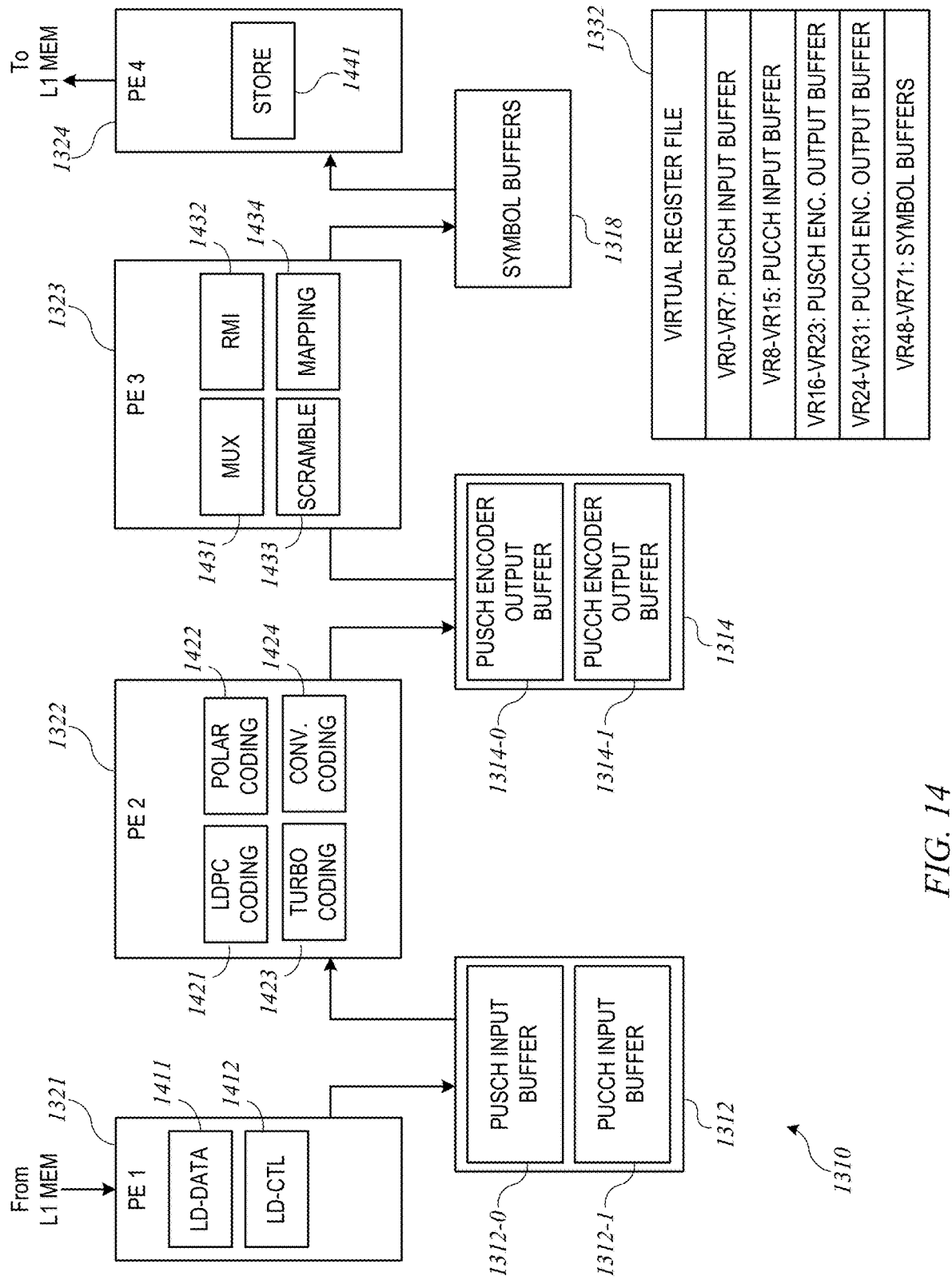
FIG. 14 shows another simplified block diagram of an uplink pipeline according to some embodiments.

FIG. 14 shows another simplified block diagram of uplink pipeline 1310, showing additional details of data paths and functional units according to some embodiments. Processing engine 1311 can include a functional unit 1411 that can execute a LD-DATA instruction to read PDSCH data from L1 memory and write code block data to input buffers 1312. (It should be understood that all names used herein to refer to instructions executed in various functional units of pipeline 1310 are used solely for convenience of description and are not intended to define or imply a particular instruction set architecture.) As noted above, the data in L1 memory may or may not have already been segmented into code blocks prior to loading into pipeline 1310. To the extent that the data is already segmented, functional unit 1411 can read code blocks from L1 memory and write each code block to input buffers 1312. In embodiments where some or all of the input data for pipeline 1310 is not already segmented, functional unit 1411 can include additional circuitry to segment incoming data into appropriately sized code blocks (depending on the particular transmission coding scheme for a given transmission block) and append CRC bits before writing the code blocks to input buffers 1312. Processing engine 1311 can also include a functional unit 1412 that can execute a LD-CTL, instruction to load UCI blocks into input buffers 1312. In some embodiments, UCI can be generated in firmware executing in control processor 1340. Control processor 1340 can write UCI into internal registers of processing engine 1311 and dispatch the LD-CTL instruction to cause functional unit 1412 to write UCI code blocks into input buffers 1312. Depending on implementation, segmentation of UCI into code blocks (and appending of CRC bits) can be performed either in control processor 1340 or in functional unit 1412.

Processing engine 1322 can include a number of functional units 1421-1424 that implement channel coding for a code block. For example, functional unit 1421 can implement LDPC coding (e.g., for 5G PUSCH); functional unit 1422 can implement polar coding (e.g., for 5G PUCCH); functional unit 1423 can implement Turbo coding (e.g., for 4G PUSCH); and functional unit 1424 can implement convolutional coding (e.g., for 4G PUCCH). In various embodiments, any number of functional units can be provided to support any number and combination of channel coding operations. Each functional unit 1421-1424 can execute a different channel coding instruction to read a code block from input buffers 1312 and write the encoded code block to encoder output buffers 1314. For instance, there can be an LDPC channel coding instruction that invokes functional unit 1421, a polar channel coding instruction that invokes functional unit 1422, a Turbo channel coding instruction that invokes functional unit 1423, and a convolutional channel coding instruction that invokes functional unit 1424. As described below, control processor 1340 can select and dispatch the appropriate channel coding instruction for a given code block.

Processing engine 1323 can include a multiplexer (or "MUX") functional unit 1431 that selects a particular encoder output buffer 1314 to provide code block data, an "RMI" functional unit 1432 that performs Rate Matching and Interleaving on code block data selected by MUX functional unit 1431 to generate a bit sequence for transmission, a scramble functional unit 1433 that scrambles the bit sequence according to the scrambling scheme applicable to the mode (e.g., 4G or 5G) and channel (e.g., PUSCH or PUCCH), and a mapping functional unit 1434 that receives groups of scrambled bits from scramble functional unit 1433 and maps them to symbols. The symbols can be assigned to OFDM component carriers, thereby producing an OFDM symbol. OFDM symbols produced by mapping functional unit 1434 can be written to symbol buffer 1318 (or directly to L1 memory depending on implementation). In some embodiments, processing engine 1323 can include multiple instances of any or all of functional units 1432-1434, each adapted to a particular operating mode or channel. For instance, there can be an instance of RMI functional unit 1432 configured to perform 5G PUSCH rate matching followed by interleaving and a separate instance of RMI functional unit 1432 configured to perform 4G PUSCH interleaving followed by rate matching. Additional instances of RMI functional unit 1432 can be provided for 5G PUCCH and/or 4G PUCCH. Similarly, there can be multiple instances of scramble functional unit 1433, each configured to apply a different scramble sequence. Alternatively, a single scramble functional unit 1433 can support applying multiple scramble sequences and can receive a control parameter indicating which scramble sequence should be applied to a particular group of bits. There can also be multiple instances of mapping functional unit 1434, with different instances supporting different constellations or different combinations of constellations. For instance, one instance of mapping functional unit 1434 can support all constellations defined for 5G PUSCH and PUCCH while another instance of mapping functional unit 1434 can support all constellations defined for 4G PUSCH and PUCCH. Other implementations are also possible. In some embodiments, an instance of an RMI functional unit 1432, a scramble functional unit 1433, and a mapping functional unit 1434 can be configured as stages in a sub-pipeline, and a single instruction for the sub-pipeline can be dispatched to invoke rate matching, interleaving, scrambling, and OFDM symbol generation for a portion of a code block selected by MUX functional unit 1431. In some embodiments, MUX functional unit 1431 can be operable to select data from either PUSCH encoder output buffer 1314-0 or PUCCH encoder output buffer 1314-1 (e.g., based on a counter that indicates which component carrier is to be populated with a symbol, as described below) and to deliver the data to the appropriate RMI/scramble/mapping sub-pipeline for the applicable mode (e.g., 4G or 5G) and channel (e.g., PUSCH or PUCCH). In some embodiments, a single instruction can be dispatched to processing engine 1323 to generate an OFDM symbol (or multiple OFDM symbols) from encoded PUSCH and PUCCH data, with MUX functional unit 1431 selecting the data source (PUSCH encoder output buffer 1314-0 or PUCCH output buffer 1314-1) for each component carrier and routing the data from the data source to the appropriate sub-pipeline to generate a symbol. Other implementations can provide separately-dispatched instructions for some or all of the MUX, RMI, scrambling, and mapping functional units 1431-1434.

Processing engine 1324 can implement a STORE instruction to transfer OFDM symbols from symbol buffers 1318 out of pipeline 1310, e.g., to L1 memory. In some embodiments, each STORE instruction can result in transferring one or more OFDM symbols (for one or more symbol periods).

In some embodiments, input buffers 1312, encoder output buffers 1314, and symbol buffers 1318 can be structured to facilitate multithreaded operation of pipeline 1310, in which different processing engines 1321-1324 can operate on different code blocks concurrently, with each processing engine operating on one code block at a time. For example, input buffers 1312 can include a number of distinct physical storage regions, each of which is large enough to store a code block. In some embodiments, input buffers 1312 can include a PUSCH input buffer 1312-0 that has storage regions for PUSCH code blocks (which can be up to about 8 kb in size for 5G) and a PUCCH input buffer 1312-1 that has storage regions for PUCCH code blocks (which typically are significantly smaller, e.g., tens of bits rather than thousands). Similarly, encoder output buffers 1314 can include a number of distinct physical storage regions, each of which can be large enough to store a channel-coded code block. As with input buffers 1312, encoder output buffers 1314 can include a PUSCH encoder output buffer 1314-0 having storage regions for PUSCH code blocks and a PUCCH encoder output buffer 1314-1 having storage regions for PUCCH code blocks. Symbol buffers 1318 can include a number of distinct physical storage regions, each of which can be large enough to store an OFDM symbol (e.g., a set of complex numbers representing symbols for the component carriers). Other implementations are also possible.

Storage regions in input buffers 1312, encoder output buffers 1314, and symbol buffers 1318 can be mapped to virtual addresses in a virtual address space. For example, as shown in virtual register file 1332, a first group of virtual addresses (VR0-VR7) can map to different regions of PUSCH input buffer 1312-0, with each virtual address corresponding to a region large enough to store a PUSCH code block. (In some embodiments, a virtual address can be mapped to a region large enough to store a code block of maximum size.) A second group of virtual addresses (VR8-VR15) can map to different regions of PUCCH input buffer 1312-1, with each virtual address in the second group corresponding to a region large enough to store a PUCCH code block. Similar virtual address mappings can be applied to encoder output buffers 1314-0, 1314-1 and to symbol buffers 1318. In this example, eight virtual addresses are allocated to each type of buffer, and different virtual addresses can map to different amounts of physical memory. Other virtual address mappings can be used as long as different virtual addresses map to different, non-overlapping regions in the various buffers. Further, the number of virtual addresses mapped to a particular buffer can depend on various design considerations, including the size of the buffer, the amount of data (e.g., code block) at a particular stage in pipeline 1310, and the number of code blocks or threads for which concurrent execution capability is desirable. Thus, for instance, the number of virtual addresses that map to regions in PUSCH input buffer 1312-0 can be equal to or different from the number of virtual addresses that map to regions in PUCCH input buffer 1312-1, and the number of virtual addresses that map to regions in PUSCH encoder output buffer 1314-0 can be equal to or different from the number of virtual addresses that map to regions in PUSCH input buffer 1312-0, and so on. In some embodiments, the same buffers and virtual addresses can be used for both 4G and 5G operating modes.

As with any implementation of pipeline 310 of FIG. 3, operation of pipeline 1310 can be defined using program code (e.g., firmware) executed by control processor 1340. Control processor 1340 can issue instructions in order to pipeline 1310, and each instruction can enter the dispatch queue (shown in FIG. 4) of the appropriate one of processing engines 1321-1324. The instructions can specify virtual addresses for input data and/or output data in the virtual address space of pipeline 1310 (e.g., virtual register file 1332), which can encompass all locations in input buffers 1312, encoder output buffers 1314, and symbol buffers 1318. The virtual address space can be defined using the mapping shown in FIG. 14, or other mappings can be used. In some embodiments, the virtual address space can also include one or more virtual addresses mapped to L1 memory (or portions thereof).

Processing engines 1321-1324 can interact with interlock controller 1330 as described above with reference to FIGS. 6 and 7. For example, receipt of an instruction in the dispatch queue of any of processing engines 1321-1324 can trigger sending of a read-lock request for the input virtual address and/or a write-lock request for the output virtual address to interlock controller 1330 (e.g., as shown in FIG. 6). Completion of an instruction in any one of processing engines 1321-1324 can trigger sending of a clear request to interlock controller (e.g., as shown in FIG. 7). Prior to executing the next instruction in the dispatch queue, each processing engine 1321-1324 can poll interlock controller 1330 with the input virtual address and/or output virtual address of the instruction (as appropriate) and can wait to execute the instruction until interlock controller 1330 returns a Grant response for all polled virtual addresses (e.g., as shown in FIG. 7). Interlock controller 1330 can implement the logic described above (e.g., as shown in FIGS. 9 and 10) to respond to read-lock, write-lock, clear, and poll requests. Thus, data synchronization within pipeline 1310 can be agnostic to the particular processing activity of processing engines 1321-1324.

In some embodiments, pipeline 1310 can be used to execute various different threads, where a thread can include a sequence of operations performed on a set of input data to produce a set of output data. For example, different threads can be defined for 5G PUSCH encoding, 5G PUCCH encoding, 4G PUSCH encoding, 4G PUCCH encoding, and for OFDM symbol generation. Control processor 1340 can determine what type(s) of data are available to transmit at a given time, then launch appropriate threads to prepare the data for transmission via 4G or 5G radio area network.

To illustrate operation of pipeline 1310, reference is made to FIGS. 15-19, which show flow diagrams of processes that can be executed using uplink pipeline 1300 according to some embodiments. Each process can be implemented, e.g., using program code to define a routine (e.g., function or subroutine) executable in control processor 1340. In some embodiments, any of the processes shown in FIGS. 15-19 can be launched at desired points in time by invoking the appropriate routine. The processes can execute as separate threads, concurrently or sequentially.

Figure 15:
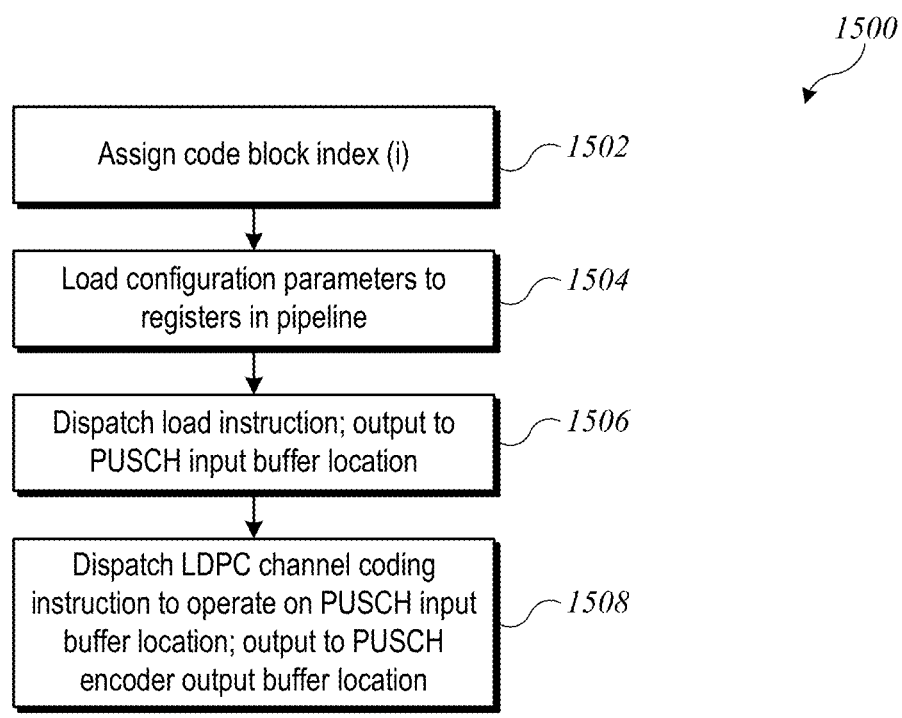
FIGS. 15-20 show flow diagrams of processes that can be executed using an uplink pipeline according to some embodiments.

FIG. 15 shows a flow diagram of a process 1500 for encoding 5G PUSCH data according to some embodiments. Process 1500 can be a routine that is invoked for each code block of a PUSCH transport block. At block 1502, a code-block index (i) can be assigned to the code block. In some embodiments, control processor 1340 can assign the code block index using a counter that increments each time a new PUSCH code block is processed. At block 1504, control processor 1340 can load configuration parameters for PUSCH encoding into control and status registers of pipeline 1310. For instance, control processor 1340 can dispatch register-write instructions to pipeline 1310. These instructions can be routed to the appropriate processing engines 1321-1324 and queued in the dispatch queue with all other instructions for that processing engine. In various embodiments, the configuration parameters can be used to define any configurable parameter of processing engines 1321-1324. Examples include code block size, LDPC base graph and lifting size and any other parameters that may apply. In some embodiments, updated configuration parameters are loaded parameters change between code blocks, and block 1504 can be modified (or skipped entirely) depending on which, if any, configuration parameters have changed.

At block 1506, control processor 1340 can dispatch a load instruction (e.g., an LD-DATA instruction) to pipeline 1310 to load the code block to be processed into input buffers 1312. The load instruction can specify, as an input address, a location in L1 memory where the code block is stored and can specify, as an output virtual address, an address of a code block region within PUSCH input buffer 1312-0. The output virtual address can be different for different code blocks. For example, if the number of code block regions in PUSCH input buffer 1312-0 that have distinct virtual addresses is $K_1$ and the first virtual address mapped to PUSCH input buffer 1312-0 is VR0, then the output virtual address for the load instruction at block 1506 can be $VR[0+(i \% K_1)]$, where i is the code block index. In this manner, successive executions of process 1500 can cycle through the available code-block storage regions in PUSCH input buffer 1312-0.

At block 1508, control processor 1340 can dispatch an LDPC channel coding instruction to pipeline 1310. The LDPC channel coding instruction can invoke operation of functional unit 1421 to perform LDPC channel coding on a code block. The LDPC channel coding instruction can specify, as an input virtual address, the same virtual address that was used as the output virtual address of the load instruction at block 1506 (e.g., $VR[0+(i \% K_1)]$). The channel coding instruction can specify, as an output virtual address, an address of a code block region in encoder output buffer 1314-0. The output virtual address can be different for different code blocks. For example, if the number of code block regions in PUSCH encoder output buffer 1314-0 that have distinct virtual addresses is $K_2$ and the first virtual address mapped to PUSCH encoder output buffer 1314-0 is VR16, then the output virtual address for the channel coding instruction at block 1508 can be $VR[16+(i \% K_2)]$. After dispatching the LDPC channel coding instruction at block 1508, control processor 1340 can continue with other operations. In some embodiments, the other operations can include another execution of process 1500. For example, control processor 1340 can execute process 1500 in a loop for each code block in a transport block, incrementing the code block counter i at each iteration of the loop so that successive input code blocks are written to different regions within input buffer 1312-0 and so that successive encoded code blocks are written to different regions within encoder output buffer 1314-0.

As each instruction in process 1500 is dispatched to pipeline 1310 and routed to one of processing engines 1321-1324, the dispatch queue in the processing engine that receives the instruction issues a read-lock for the input buffer and a write-lock for the output buffer to interlock controller 1330. For instance, the first instruction dispatched to pipeline 1310 during process 1500 (other than parameter-setting instructions) can be an LD-DATA instruction, which can have output virtual address VR0 (e.g., if the first code block has code block index i=0). Upon receipt of the load instruction, the dispatch queue of processing engine 1321 issues a write-lock for virtual address VR0 to interlock controller 1330. Processing engine 1321 can begin polling interlock controller 1330 with virtual address VR0 and can issue the load instruction to functional unit 1411 once interlock controller 1330 returns "Grant." The second instruction dispatched to pipeline 1310 can be an LDPC channel coding instruction with input virtual address VR0 and output virtual address VR16. This instruction is received at processing engine 1322, which can issue a read-lock for virtual address VR0 and a write-lock for virtual address VR16 to interlock controller 1330. Processing engine 1322 can issue the LDPC channel coding instruction to functional unit 1421 after interlock controller 1330 returns "Grant" for reading from VR0 and for reading from VR16. Since interlock controller 1330 does not return "Grant" for reading from VR0 until processing engine 1321 clears its write-lock, functional unit 1421 does not begin encoding the code block until the code block has been written to the input buffer location. In this manner, data dependencies can be enforced, without control processor 1340 having to wait to dispatch the LDPC channel coding instruction. If an LD-DATA instruction is then dispatched for a second code block (e.g., i=1) and specifies a different output virtual address (e.g., VR1), execution of the second LD-DATA instruction need not wait for completion of the LDPC channel coding instruction for the first code block. Interlock controller 1330 delays operation of processing engine 1321 to load a code block only when the destination is still read-locked by processing engine 1322. In some embodiments, this situation can be avoided by providing input buffers that can store multiple code blocks.

Figure 16:
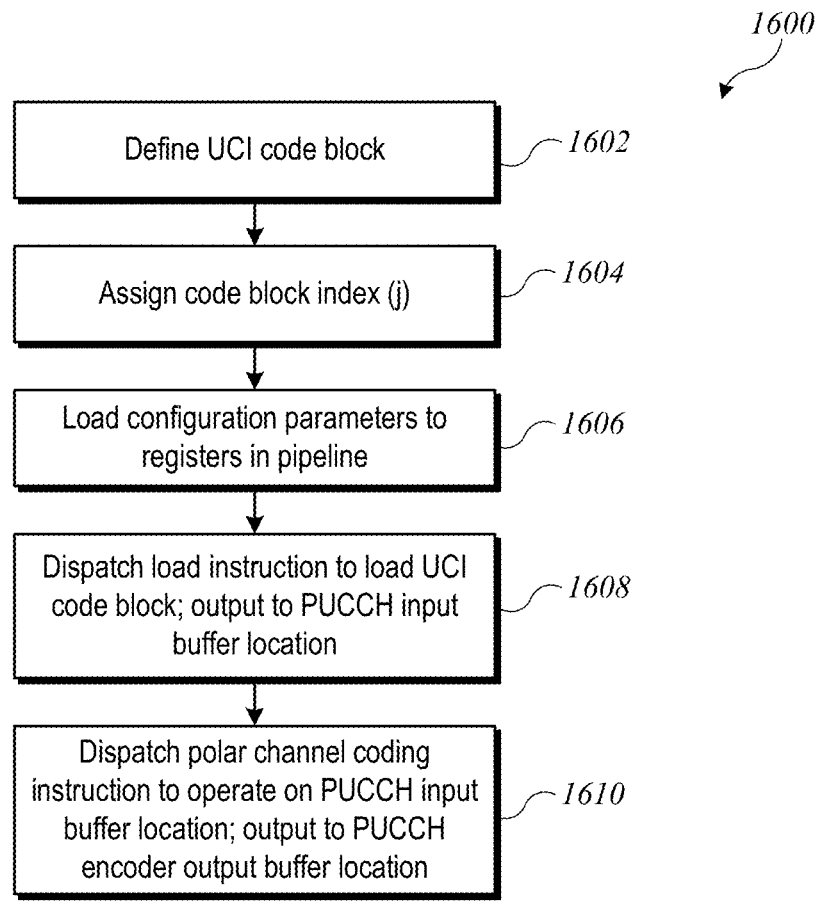

FIG. 16 shows a flow diagram of a process 1600 for encoding 5G PUCCH UCI according to some embodiments. Process 1600 can be a routine that is invoked for each code block of UCI. In this example it is assumed that control processor 1340 has generated UCI; the particular manner of generating UCI is not relevant to understanding this description. At block 1602, control processor 1340 can define a UCI code block. Depending on implementation, defining a UCI code block can include operations such as segmenting the UCI into code blocks of an appropriate size and/or computing and appending CRC bits. At block 1304, a code-block index (j) can be assigned to the UCI code block. In some embodiments, control processor 1340 can assign the code block identifier using a counter that increments each time a new UCI code block is processed, and the PUCCH code block counter can increment independently of the PUSCH code block counter used in process 1500. At block 1606, control processor 1340 can load configuration parameters for the code block into control and status registers of pipeline 1310. For instance, control processor 1340 can dispatch register-write instructions to pipeline 1310. These instructions can be routed to the appropriate processing engines 1321-1324 and queued in the dispatch queue with all other instructions for that processing engine. In various embodiments, the configuration parameters can be used to define any configurable parameter of processing engines 1321-1324. Examples include the PUCCH format and number of UCI bits in the code block. In some embodiments, updated configuration parameters are loaded as when parameters change between code blocks, and block 1606 can be modified (or skipped entirely) depending on which if any parameters have changed. At block 1608, control processor 1340 can dispatch a load instruction (e.g., an LD-CTL instruction) to pipeline 1310 to load the UCI code block to be processed into input buffers 1312. In some embodiments, dispatching the load instruction can include dispatching a register-write instruction that writes the UCI code block to an internal register in processing engine 1321 followed by dispatching a LD-CTL instruction to transfer the UCI code block from the internal register to a buffer location specified as an output virtual address of the LD-CTL instruction. The output virtual address can map to a code block region within PUCCH input buffer 1312-1 and can be different for different code blocks. For example, if the number of code block regions in PUCCH input buffer 1312-1 that have distinct virtual addresses is $K_3$ and the first virtual address mapped to PUCCH input buffer 1312-1 is VR8, then the output virtual address for the load instruction at block 1608 can be VR[8+(j % $K_3$)]. At block 1610, control processor 1340 can dispatch a polar channel coding instruction to pipeline 1310 The polar channel coding instruction can invoke operation of functional unit 1422 to encode a UCI code block. The polar channel coding instruction can specify, as an input virtual address, the same virtual address used as the output virtual address of the load instruction at block 1608 (e.g., VR[8+(j % $K_3$)]). The polar channel coding instruction can specify, as an output virtual address, an address of a UCI code block region in encoder output buffer 1314-1. The output virtual address can be different for different code blocks. For example, if the number of code block regions in PUCCH encoder output buffer 1314-1 that have distinct virtual addresses is $K_4$ and the first virtual address mapped to PUCCH encoder output buffer 1314-1 is VR24, then the output virtual address for the channel coding instruction at block 1610 can be VR[24+(j % $K_4$)]. After dispatching the polar channel coding instruction at block 1610, control processor 1340 can continue with other operations. In some embodiments, the other operations can include another execution of process 1600. For example, the amount of UCI to be transmitted in a given instance may be larger than one UCI code block. In some embodiments, control processor 1340 can execute process 1600 in a loop for each UCI code block, incrementing the code block counter j at each iteration of the loop so that successive input code blocks are written to different regions within PUCCH input buffer 1312-1 and so that successive encoded code blocks are written to different regions within PUCCH encoder output buffer 1314-1.

Execution of dispatched instructions for process 1600 can proceed analogously to execution of dispatched instructions for process 1500 as described above. In this example, the virtual addresses used for UCI code blocks do not overlap with virtual addresses used for data (PUSCH) code blocks, and interlock controller does not delay execution of instructions from process 1500 due to instructions from process 1600 or vice versa. In that sense, processes 1500 and 1600 are independent. However, in some embodiments a processing engine (e.g., processing engine 1321 or 1322) executes one instruction at a time, in dispatch-queue order. Accordingly, a later-dispatched channel coding instruction may wait for an earlier-dispatched channel coding instruction to finish, regardless of whether the two instructions operate on different code blocks. In some embodiments, the firmware code in control processor 1340 can sequence the dispatch of instructions in a manner that optimizes waiting due to execution of instructions from a different thread in the same processing engine; such optimization is under control of the developer and can be balanced against other considerations.

Figure 17:
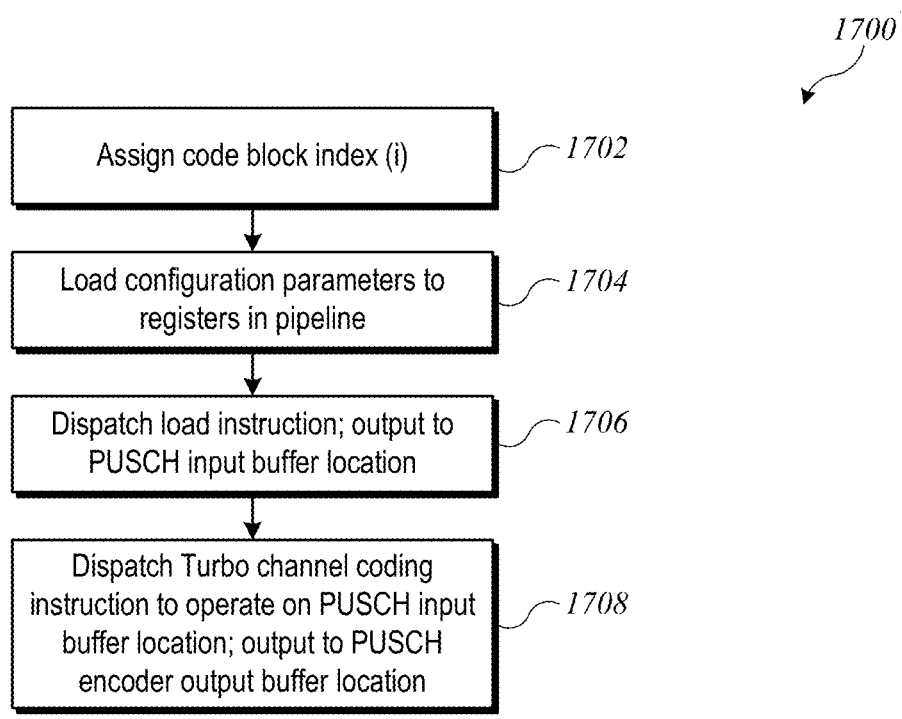

Processes 1500 and 1600 can be used for 5G PUSCH and PUCCH. In some embodiments, similar processes can be defined for the same control processor 1340 to operate in 4G mode. FIG. 17 shows a flow diagram of a process 1700 for encoding 4G PUSCH data according to some embodiments. Process 1700 can be a routine that is invoked for a 4G PUSCH code block and can be similar in many respects to process 1500. At block 1702, a code-block index (i) can be assigned to the code block, in the same manner as in process 1500. In some embodiments, 4G and 5G PUSCH code blocks can share a code-block counter; other code-block identifiers can also be used. At block 1704, control processor 1340 can load configuration parameters for the code block into control and status registers of pipeline 1310, similarly to block 1504 of process 1500, except that the configuration parameters in this case apply to 4G PUSCH. At block 1706, control processor 1340 can dispatch a load instruction (e.g., an LD-DATA instruction) to pipeline 1310 to load the code block to be processed into input buffers 1312. As with block 1506 of process 1500, the load instruction can specify, as an input address, a location in L1 memory where the code block is stored and can specify, as an output virtual address, an address of a code block region within PUSCH input buffer 1312-0. The output virtual address can be different for different code blocks and can cycle through virtual addresses of different regions in PUSCH input buffer 1312-0 in the same manner as in process 1500. At block 1708, control processor 1340 can dispatch a Turbo channel coding instruction to pipeline 1310. The Turbo channel coding instruction can invoke operation of functional unit 1423 to encode a code block. The Turbo channel coding instruction can specify input and output virtual addresses in the same manner as at block 1508 of process 1500; in this case, however, the instruction is executed by a different functional unit that applies a different channel coding scheme. After dispatching the Turbo channel coding instruction at block

1708, control processor 1340 can continue with other operations. In some embodiments, the other operations can include another execution of process 1700. For example, as with 5G PUSCH, control processor 1340 can execute process 1700 in a loop for each code block in a transport block, incrementing the code block counter at each iteration of the loop so that successive input code blocks are written to different regions within input buffer 1312-0 and so that successive encoded code blocks are written to different regions within encoder output buffer 1314-0.

Figure 18:
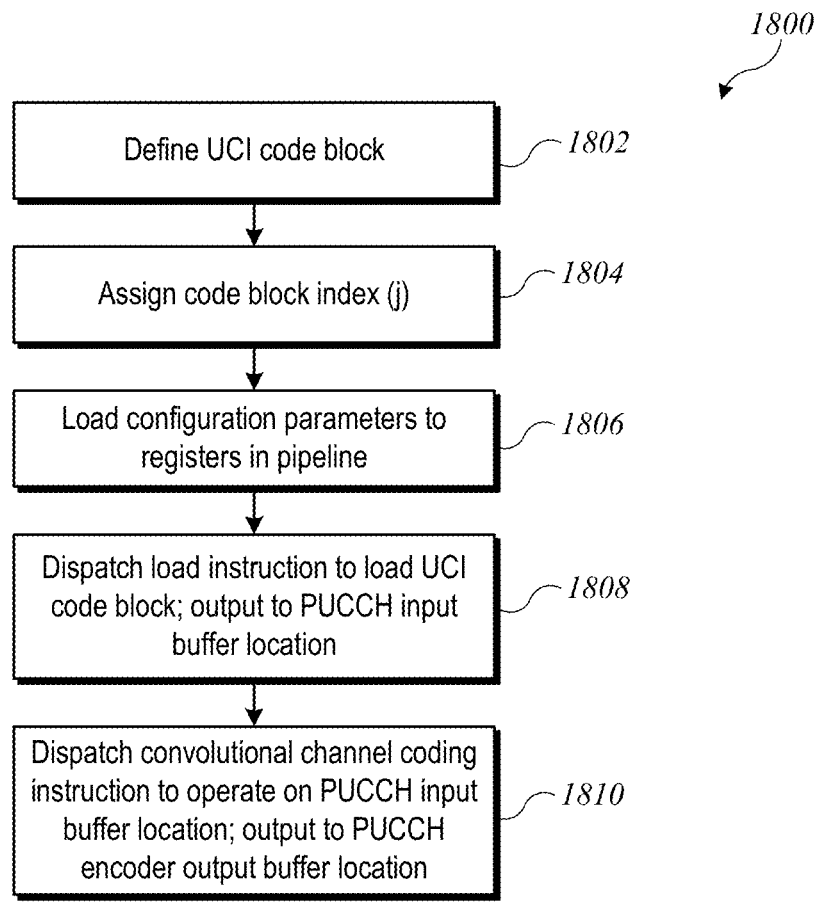

FIG. 18 shows a flow diagram of a process 1800 for 4G PUCCH UCI according to some embodiments. Process 1800 can be a routine that is invoked for each code block of UCI and can be similar in many respects to process 1600. At block 1802, control processor 1340 can define a UCI code block, similarly to block 1602 of process 1600. At block 1804, a code-block index (j) can be assigned to the code block, in the same manner as in process 1600. In some embodiments, 4G and 5G PUCCH code blocks can share a code-block counter; other code-block identifiers can also be used. At block 1806, control processor 1340 can load configuration parameters for the code block into control and status registers of pipeline 1310, similarly to block 1606 of process 1600, except that the configuration parameters in this case apply to 4G PUCCH. At block 1810, control processor 1340 can dispatch a load instruction (e.g., an LD-CTL instruction) to pipeline 1310 to load the UCI code block to be processed into input buffers 1312. As with block 1610 of process 1600, dispatching the load instruction can include dispatching a register-write instruction that writes the UCI code block to an internal register in processing engine 1321 followed by dispatching a LD-CTL instruction to transfer the UCI code block from the internal register to a location specified as an output virtual address of the LD-CTL instruction. The output virtual address can map to a code block region within PUCCH input buffer 1312-1, with the virtual address determined in the same manner as in process 1600. At block 1810, control processor 1340 can dispatch a convolutional channel coding instruction to pipeline 1310 The convolutional channel coding instruction can invoke operation of functional unit 1424 to encode a UCI code block. The convolutional channel coding instruction can specify input and output virtual addresses in the same manner as at block 1610 of process 1600; in this case, however, the instruction is executed by a different functional unit that applies a different channel coding scheme. After dispatching the convolutional channel coding instruction at block 1810, control processor 1340 can continue with other operations. In some embodiments, the other operations can include another execution of process 1800. For example, as with 5G PUCCH, control processor 1340 can execute process 1800 in a loop for multiple UCI code blocks, incrementing the code block counter j at each iteration of the loop so that successive input code blocks are written to different regions within input buffer 1312-1 and so that successive encoded code blocks are written to different regions within encoder output buffer 1314-1.

Figure 19:
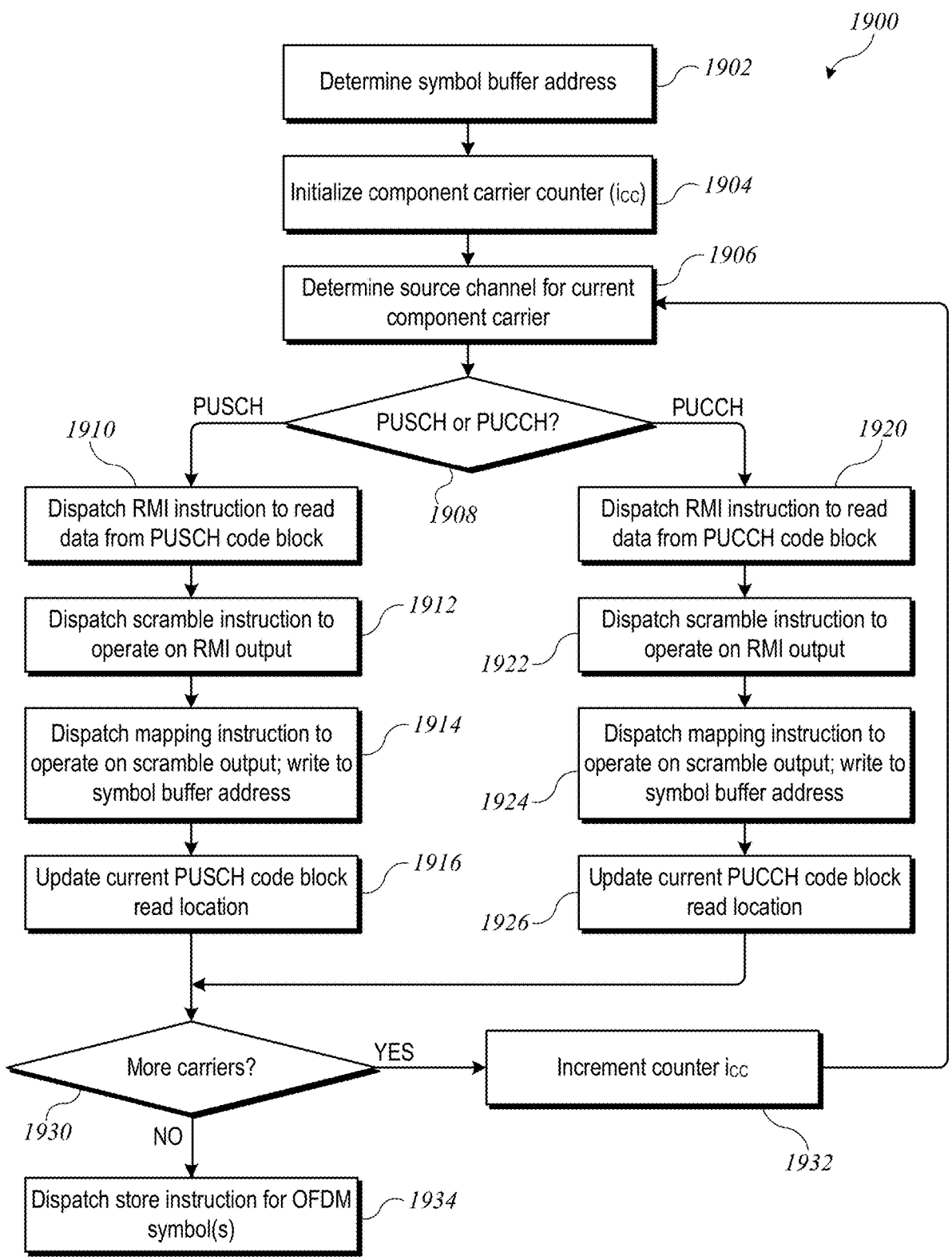

Processes 1500 and 1600 (or processes 1700 and 1800) produce channel-coded code blocks. FIG. 19 shows a flow diagram of a process 1900 to produce OFDM symbols from channel-coded code blocks according to some embodiments. Like other processes described herein, process 1900 can be a routine defined in firmware in control processor 1340 that is invoked, e.g., at regular intervals to generate symbols (in this example, one symbol for each OFDM component carrier). In this example it is assumed that channel-coded code blocks for PUSCH and PUCCH are being produced and stored in encoder output buffers 1314-0 and 1314-1 (e.g., using processes 1500 and 1600 or processes 1700 and 1800 described above). At block 1906, control processor 1340 can determine a symbol buffer virtual address for the next set of symbols. For instance, symbol buffers 1318 can include a number $K_5$ of regions, with each region being large enough to store a set of symbols, and block 1906 can include cyclically incrementing a virtual address identifier to select the next region in symbol buffers 1318. At block 1904, control processor 1340 can initialize a counter ($i_{CC}$) of component carriers, e.g., to zero. At block 1906, control processor 1340 can determine a source channel (e.g., either PUSCH or PUCCH) for the component carrier. In some embodiments, PUCCH is allocated certain resource elements in the OFDM resource grid while PUCCH is allocated other resource elements, and still other resource elements are assigned to other purposes (e.g., reference signals and the like). The particular assignment can depend on current network conditions and standards, and block 1906 can include determining which component carriers should carry PUSCH or PUCCH for a given symbol period. Process 1900 can also include other operations, such as reading or writing control information from or to control and status registers of processing engine 1323, e.g., to define a bit sequence for scrambling, rate matching parameters, symbol constellations to use for PUSCH and PUCCH, number of component carriers, and so on. If, at block 1908, the component carrier $i_{CC}$ is allocated for PUSCH, then at block 1910, control processor 1340 can dispatch a rate matching instruction for PUSCH to pipeline 1310. In some embodiments, the PUSCH rate matching instruction can have an input virtual address specifying a current code block in PUSCH encoder output buffer 1314-0. For example, control processor 1340 can keep track of which virtual addresses in encoder output buffer 1314-0 have been specified as output virtual addresses for channel coding instructions (e.g., based on process 1500 or process 1700) but not yet used for symbol mapping. As noted above, execution of the PUSCH rate matching instruction in processing engine 1323 (e.g., in RMI functional unit 1432) can include both rate matching and interleaving in the appropriate order for the current mode (e.g., interleaving first for 4G; rate matching first for 5G). At block 1912, control processor 1340 can dispatch a scramble instruction to pipeline 1310 to perform scrambling on output data from RMI functional unit 1432. In some embodiments, output data from RMI functional unit 1432 is stored in internal registers within processing engine 1323, and control processor 1340 does not need to specify an input virtual address for the scramble instruction. Scrambling can be performed, e.g., by scramble functional unit 1433. At block 1914, control processor 1340 can dispatch a mapping instruction to pipeline 1310 to perform symbol mapping on the scrambled output. In some embodiments, output data from scramble functional unit 1433 is stored in internal registers within processing engine 1323, and control processor 1340 does not need to specify an input virtual address for the mapping instruction. At block 1916, control processor 1340 can update the current code block and other status information, e.g., based on whether mapping has been completed for all bits for the current code block.

If, at block 1908, the component carrier $i_{CC}$ is allocated for PUCCH, then at block 1920, control processor 1340 can dispatch a rate matching instruction for PUCCH to pipeline 1310. In some embodiments, the PUCCH rate matching instruction can have an input virtual address specifying a current UCI code block in PUCCH encoder output buffer 1314-1. For example, control processor 1340 can keep track of which virtual addresses in encoder output buffer 1314-1 have been specified as output virtual addresses for channel coding instructions (e.g., based on process 1600 or process 1800) but not yet used for symbol mapping. As noted above, execution of the PUCCH rate matching instruction in processing engine 1323 (e.g., in RMI functional unit 1432) can include both rate matching and interleaving in the appropriate order for the current mode. At block 1922, control processor 1340 can dispatch a scramble instruction to pipeline 1310 to perform scrambling on output data from RMI functional unit 1432. The scrambling can be implemented appropriately for PUCCH. In some embodiments, output data from RMI functional unit 1432 is stored in internal registers within processing engine 1323, and control processor 1340 does not need to specify an input virtual address for the scramble instruction. At block 1924, control processor 1340 can dispatch a mapping instruction to pipeline 1310 to perform symbol mapping on the scrambled output. In some embodiments, output data from scramble functional unit 1433 is stored in internal registers within processing engine 1323, and control processor 1340 does not need to specify an input virtual address for the mapping instruction. At block 1926, control processor 1340 can update the current code block and other status information, e.g., based on whether mapping has been completed for all bits for the current code block.

In some embodiments, some or all the instructions dispatched for PUCCH at blocks 1920, 1922, and 1924 can be the same as the instructions dispatched for PUSCH at blocks 1910, 1912, and 1914, with different configuration parameters, or the PUSCH and PUCCH instructions can be different instructions that are executed in different instances of the functional units in processing engine 1323, with each instance adapted for a particular uplink channel and/or mode.

In some embodiments, the number of dispatched instructions can be reduced. For instance, if the rate matching, interleaving, and mapping functional units 1432-1434 for a particular channel (e.g., PUSCH or PUCCH) and mode (e.g., 4G or 5G) are implemented as a sub-pipeline, a single dispatched instruction can suffice to invoke all operations in the appropriate order. Operations can occur on the fly, with data passing directly from one functional unit to the next within the sub-pipeline. For instance, the output from RMI functional unit 1432 can be scrambled on the fly by scramble functional unit 1433 and delivered to mapping functional unit 1434, which can write the resulting symbols to symbol buffers 1318.

At block 1930, after dispatching appropriate instructions for PUSCH or PUCCH for a particular component carrier, control processor 1730 can determine whether symbols for more component carriers remain to be generated, e.g., by comparing counter ice to the number of component carriers. If symbols remain to be generated, control processor 1730 can increment counter $i_{CC}$ at block 1932 and return to block 1906 to generate a symbol for the next component carrier. After all component carriers have been populated, at block 1934, control processor 1730 can issue a STORE instruction to pipeline 1310 to transfer the OFDM symbol(s) to L1 memory. The STORE instruction can specify the virtual address of the symbol buffer identified at block 1902 as a source. After dispatching the STORE instruction at block 1934, control processor 1340 can continue with other operations, including additional executions of process 1900.

In some embodiments, process 1900 can support 4G and 5G operating modes. For instance, as noted above, processing engine 1323 can include multiple instances of the functional units, with each instance configured to support a different mode and/or channel. Thus, switching process 1900 between 4G and 5G can include changing which instructions are dispatched to pipeline 1310 and/or changing configuration parameters and dispatching the same instructions.

In some embodiments where RMI functional unit 1432, scramble functional unit 1433, and mapping functional unit 1434 are implemented as a sub-pipeline, MUX functional unit 1431 can implement the counter ice and can determine whether to select PUSCH or PUCCH as the data source for a given component carrier. Where this is the case, the number of dispatched instructions can be reduced further; for instance, control processor 1730 can dispatch a single instruction to processing engine 1323 to generate an OFDM symbol, and processing engine 1323 can implement a process similar to process 1900.

Figure 20:
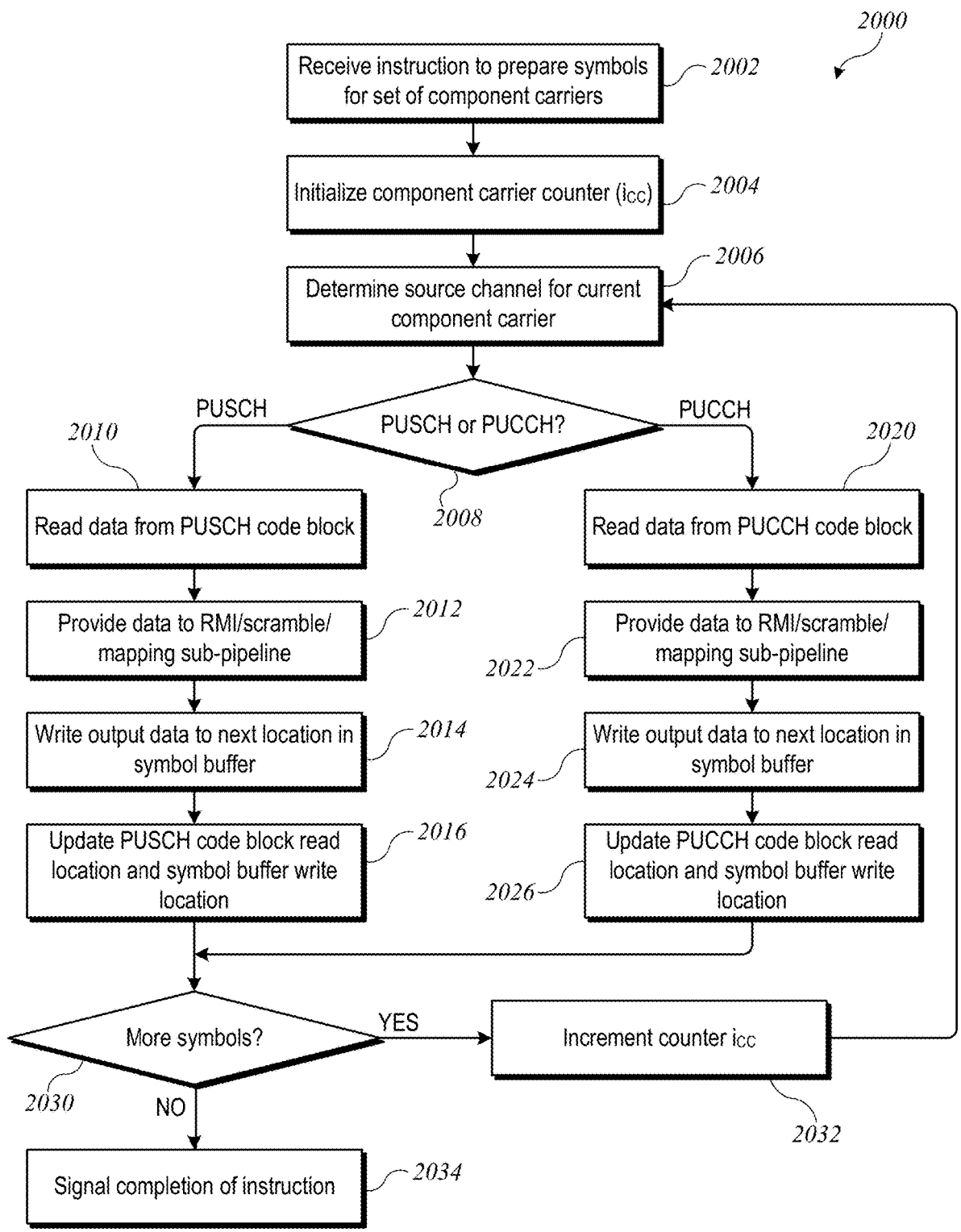

By way of example, FIG. 20 shows a flow diagram of a process 2000 that can be implemented in processing engine 1323 according to some embodiments. In this example it is assumed that channel-coded code blocks for PUSCH and PUCCH are being produced and stored in encoder output buffers 1314-0 and 1314-1 (e.g., using processes 1500 and 1600 or processes 1700 and 1800 described above). After dispatching instructions to processing engines 1321 and 1322 to encode a PUSCH code block (or segment thereof) and corresponding PUCCH UCI, control processor 1340 can dispatch an instruction to processing engine 1323 to generate an OFDM symbol from the code blocks. At block 2002, processing engine 1323 can receive the dispatched instruction to generate an OFDM symbol. The instruction can include various configuration parameters, such as rate-matching parameters, scramble sequence, symbol constellation, number of OFDM component carriers and the like. In some embodiments, these parameters can be provided via control and status registers as described above. The instruction can also provide input virtual addresses specifying the location of a current code block in PUSCH encoder output buffer 1314-0 and a corresponding UCI code block in PUCCH encoder output buffer 1314-1. The instruction can also provide an output virtual address specifying a region in symbol buffers 1318 for receiving the OFDM symbol. As in process 1900, the region in symbol buffer 1318 can be selected cyclically as instructions are dispatched. At block 2004, processing engine 1323 can initialize a counter ($i_{CC}$) of component carriers, e.g., to zero. At block 2006, processing engine 1323 can determine a source channel (e.g., either PUSCH or PUCCH) for the component carrier. As described above, in some embodiments, PUCCH is allocated certain resource elements in the OFDM resource grid while PUCCH is allocated other resource elements, and still other resource elements are assigned to other purposes (e.g., reference signals and the like). The particular assignment can depend on current network conditions and standards, and block 2006 can include determining which component carriers should carry PUSCH or PUCCH for a given symbol period. If, at block 2008, the component carrier $i_{CC}$ is allocated for PUSCH, then at block 2010, MUX functional unit 1431 can read data from PUSCH encoder output buffer 1314-0. The read location can be initialized based on the input virtual address and updated as data is read. At block 2012, MUX functional unit 1431 can provide the data to an RMI/scramble/mapping sub-pipeline (e.g., as described above). As described above, some embodiments may include different instances of RMI/scramble/mapping sub-pipelines for different operating modes and/or channels, and MUX functional unit 1431 can select the appropriate pipeline based on the configuration parameters associated with the instruction being executed. At block 2014, the RMI/scramble/mapping sub-pipeline can write the output data (symbols) to the next location in symbol buffers 1318. The write location can be initialized based on the output virtual address and updated as data is written. At block 2016, processing engine 1323 can update the PUSCH code block read address and symbol buffer write location.

If, at block 2008, the component carrier $i_{CC}$ is allocated for PUCCH, then at block 2020, MUX functional unit 1431 can read data from PUCCH encoder output buffer 1314-1. The read location can be initialized based on the input virtual address and updated as data is read. At block 2022, MUX functional unit 1431 can provide the data to an RMI/scramble/mapping sub-pipeline (e.g., as described above). As described above, some embodiments may include different instances of RMI/scramble/mapping sub-pipelines for different operating modes and/or channels, and MUX functional unit 1431 can select the appropriate pipeline based on the configuration parameters associated with the instruction being executed. At block 2024, the RMI/scramble/mapping sub-pipeline can write the output data (symbols) to the next location in symbol buffers 1318. The write location can be initialized based on the output virtual address and updated as data is written. At block 2026, processing engine 1323 can update the PUCCH code block read address and symbol buffer write location.

At block 2030, processing engine 1323 can determine whether more symbols remain to be generated (e.g., based on the number of component carriers). If symbols remain to be generated, processing engine 1323 can increment counter ice at block 2032 and return to block 2006 to generate a symbol for the next component carrier. After all symbols have been generated, processing engine 1323 can signal completion of the instruction at block 2034. In some embodiments, completion of the instruction can include clearing read-locks associated with the input virtual addresses and clearing write-locks associated with the output virtual address.

The processes shown in FIGS. 15-20 are illustrative, and variations and modifications are possible. For instance, each of processes 1500, 1600, 1700, 1800 is shown as operating at the granularity of a code block. In some embodiments, as noted above, segmentation of a PUSCH transport block into code blocks and appending CRC bits can be implemented within pipeline 1310, and process 1500 (or process 1700) can incorporate dispatching any appropriate instructions to perform these operations. Implementing PUSCH code-block segmentation in pipeline 1310 can result in multiple code blocks being written to PUSCH input buffers 1312-0, and multiple channel coding instructions being dispatched to perform channel coding on each code block. Likewise, code block segmentation for PUCCH can be implemented either in control processor 1340 executing firmware or in hardware in processing engine 1321, and process 1600 (or process 1800) can incorporate dispatching any appropriate instructions to perform these operations and/or dispatching multiple channel coding instructions to perform channel coding on each UCI code block. In some embodiments, processes 1500, 1600, 1700, and 1800 can operate at finer granularity (e.g., producing enough data per execution to populate one OFDM symbol). Likewise, while processes 1900 and 2000 are described as generating one OFDM symbol, in some embodiments process 1900 or process 2000 can generate more or fewer OFDM symbols per execution.

As noted above, in some embodiments, rate matching and interleaving can be implemented in processing engine 1322. Where this is the case, dispatching of rate-matching and interleaving instructions to processing engine 1322 can be incorporated into processes 1500, 1600, 1700, and 1800. Encoder output buffer 1314-0 can store a stream of data bits (corresponding to concatenated PUSCH code blocks in FIG. 11 or FIG. 12) and encoder output buffer 1314-1 can store a stream of UCI bits (corresponding to concatenated PUCCH code blocks in FIG. 11 or FIG. 12). Process 1900 (or process 2000) can omit rate matching and/or interleaving instructions (or operations); processing engine 1323 can execute scrambling and OFDM symbol generation instructions (or operations).

In some embodiments, control processor 1340 can dispatch instructions to pipeline 1310 in order of desired operations and with virtual addresses indicating data dependencies. As long as instructions that have data dependencies are issued in the desired execution order, independent instructions (e.g., instructions pertaining to different code blocks) can be issued in any order. For instance, it is not necessary for control processor 1340 to dispatch all instructions for process 1600 before initiating process 1700; instructions for different processes operating on different code blocks can be dispatched in any order relative to each other. This flexibility can allow the firmware in control processor 1340 to be optimized to manage the resource sharing between different threads (e.g., corresponding to different code blocks or different component carriers). Within pipeline 1310, as long as different instructions specify different virtual addresses (which map to different physical buffers), each processing engine 1321-1324 can operate independently, executing its own instructions (in order) regardless of what other processing engines 1321-1324 may be doing. Where different instructions specify the same virtual address, interlock controller 1330 enforces the data dependencies. In this manner, the desired sequence of operations (e.g., load, apply channel coding, rate match, interleave, scramble, map) can be performed for each code block. Different processing engines can operate concurrently on different code blocks stored in different physical buffers, while the correct sequence of operations for a particular code block is preserved. Stated differently, pipeline 1310 can provide a multithreaded processing pipeline in which different code blocks are processed in different threads and multiple threads can be executed concurrently.

By tracking the read-locks and write-locks from the processing engines 1321-1324 in pipeline 1310, and by granting or denying poll requests from processing engines 1321-1324 in pipeline 1310 based on the absence or presence of earlier read-locks and/or write-locks (e.g., as described above with reference to FIG. 10), interlock controller 1330 can enforce in-order execution of operations within a thread while allowing other threads to execute independently as long as no buffer-access conflicts arise between threads. Buffer-access conflicts between threads can be managed by interlock controller 1330 using exactly the same logic that manages data dependencies within threads: instructions, regardless of thread, are granted access to a particular buffer only after any previous read-locks and/or write-locks have been cleared, regardless of what thread a particular instruction may be associated with. Thus, interlock controller 1330 can enforce correct behavior within or among threads while remaining agnostic as to how many processing engines (or functional units) are present in pipeline 1310, how many thread are being executed, what operations are being performed in each thread, or how long a given operation may take.

For each thread, the sequence of processing operations is defined by the sequence of dispatched instructions (with virtual addresses used to manage data dependencies), and the sequence of dispatched instructions can be different for different threads. In some embodiments, different concurrent threads can be executing different instruction sequences. For instance, a cellular modem processor may switch between different operating modes (e.g., 4G and 5G) as network conditions change, which can happen frequently in a mobile device. In some embodiments, different concurrent threads can include threads performing encoding for different operating modes, and there is no need to flush pipeline 1310 when switching between operating modes. This can help to support high throughput in a multimode environment.

It should also be noted that control processor 1340 can be agnostic to the operation of interlock controller 1330. For instance, the program code executed by control processor 1340 (e.g., implementing any of processes 1500, 1600, 1700, 1800 or 1900) does not need to include any instructions regarding read-locks, write-locks, or polling; these operations are performed for every instruction by hardware in pipeline 1310. In some embodiments, the instructions dispatched by control processor 1340 can identify input and output buffers using the same virtual addresses used by interlock controller 1330. Alternatively, instructions dispatched by control processor 1340 can use a different addressing scheme (e.g., physical addresses or a buffer index or the like), and processing engines 1321-1324 can translate addresses for dispatched instructions to virtual addresses for communication with interlock controller 1330. Regardless of the particular addressing scheme, as long as input and output addresses for each instruction are specified such that different addresses correspond to different physical locations, the desired behavior is automatically produced by the hardware in the pipeline. In addition, control processor 1340 does not need to determine whether a particular instruction is ready to execute. Control processor 1340 can simply dispatch instructions in order to pipeline 1310, and the hardware in pipeline 1310 can manage the execution in the manner described above. If one or more dispatch queues in pipeline 1310 fills to capacity, backpressure can be used to pause instruction dispatch by control processor 1340 until space becomes available in the relevant dispatch queue. Control processor 1340 can also be agnostic to how the various functional units that execute instructions are assigned to processing engines; routing logic within pipeline 1310 can direct each dispatched instruction to the correct processing engine.

Control processor 1340 can also dispatch instructions for different threads in any relative order. For instance, control processor 1340 can dispatch one instruction for each of some number of threads (e.g., round robin dispatch for PUSCH encode, PUCCH encode, and symbol generation), then issue a next instruction for each thread. Other schemes for interleaving dispatch of instructions for different threads can be implemented, as long as the order of instructions within each thread is maintained. In some embodiments, the order of instruction dispatch between threads can be tweaked to optimize throughput, latency, or other performance considerations. Where different threads use different parameter settings, control processor 1340 can dispatch instructions to update parameter registers for each thread. The parameter-update instructions can be queued in order with all other instructions in the dispatch queues of processing engines 1321-1324, and each processing engine can update its parameter registers (by executing the parameter-update instructions) after completing execution of any instructions that may be ahead of the parameter-update instructions. Accordingly, in some embodiments there is no need to flush the pipeline between threads, even when parameters change.

It should be understood that multiple pipelines, including one or more instances of pipeline 1310, can coexist in the same cellular modem processor (e.g., as shown in FIG. 2). Each pipeline can have its own processing engines, its own buffers, its own interlock controller and virtual register file, and its own virtual address space. In some embodiments, the same control processor can dispatch instructions to multiple pipelines. For example, a control processor can dispatch instructions to one pipeline to decode PDCCH, which provides downlink control information (DCI). The decoded DCI can contain information regarding the configuration of PUSCH and/or PUCCH. The control processor can use the decoded DCI to configure uplink pipeline 1310. Alternatively, some or all of the pipelines can have their own dedicated control processor (which may allow more pipelines to operate in parallel). In the case of a sub-pipeline within a processing engine, a control processor for the sub-pipeline can be implemented within the processing engine, and the dispatching of instructions for functional units in the sub-pipeline can be driven by either hardware or firmware, depending on implementation. In each pipeline, data synchronization can be provided using a combination of firmware-based control (e.g., via control processor 340, 1340) and hardware-based dependency management (e.g., via interlock controller 330, 1330) as described herein Those skilled in the art with access to the present disclosure will appreciate that pipeline data synchronization using a combination of firmware-based control and hardware-based dependency management as described herein can provide various advantages over other approaches to flow-control or data synchronization.

For example, to implement purely hardware-based flow control, a system designer models each processing engine as a state machine, and possible state sequences depend on the possible pairs of processing engines (or functional units) that may operate successively on the same data block and how long each operation might take. In a pipeline with several processing engines, each having several possible states, the number of combination of states can become large, making it difficult to verify correct operation of the pipeline under all possible conditions. For firmware-based flow control, the hardware state machine can be simplified, but the firmware developer needs to consider the possible states and sequences of states and incorporate exceptions and event handling into the program code.

In contrast, in various embodiments described herein, each processing engine operates according to a simple state machine: if all data dependencies for the next instruction are satisfied, proceed; if not, wait. The same state machine applies to each processing engine (or functional unit) in the pipeline. The simplicity of the state machines can simplify validation of the hardware. Likewise, the firmware developer does not have to wrestle with a complex state machine; a firmware developer can simply write program code expressing the intended data flow. For instance, to cause processing engine 323 to operate on data output from processing engine 322, the developer can code an instruction executable by processing engine 322 that writes to a given address followed by an instruction executable by processing engine 323 that reads from that address. The developer can write such code almost intuitively, without knowing details of the hardware (including which processing engines execute which instructions).

Some embodiments can also provide advantages of flexibility. For instance, adapting hardware-based flow control to changes in the processing algorithms can be difficult and often requires new circuitry. In contrast, in embodiments described herein, at least some changes to algorithms can be implemented simply by updating the firmware. For example, if a new base graph or lifting size is added to the set of LDPC base graphs and lifting sizes defined for 5G PUSCH, the firmware executed by control processor 1340 can be updated to provide the new base graph or lifting size as a parameter to pipeline 1310 (in particular to functional unit 1421), and a hardware upgrade may not be necessary. The new base graph or lifting size may change the amount of time required for functional unit 1421 to encode a code block; however, the same simple state machine can still apply, with interlock controller 1330 assuring that downthread instructions will wait until functional unit 1421 has finished encoding the code block.

In addition, some embodiments described herein provide a unified (or generic) data synchronization architecture. The interlock controller design and operation is not specific to any particular processing engines or functional units, or to any particular combination of processing engines and functional units. The interlock controller can be agnostic as to how the virtual address space maps to physical memory (e.g., buffers as described above); instead, the virtual addresses are used simply as indicators of data dependencies. Further, the decision logic in the interlock controller can operate independently of any particular functionality of any processing engine (e.g., which functional units are in a particular processing engine) or pipeline. Data dependencies are defined based on the order of instruction dispatch and on the input and output address information specified for each instruction, and the same decision logic to determine whether data dependencies have been satisfied can apply without regard to of the amount of data, particular operations performed on the data, or where the data is physically stored. Consequently, there is no need to design an interlock controller separately for each pipeline. In some embodiments, an instance of the same interlock controller circuitry can be deployed for every instance of every pipeline in the processor, with the only difference between interlock controller instances being the number of processing engines from which the interlock controller receives requests. This can greatly simplify the implementation of flow-control in a processor that has multiple disparate pipelines, such as a cellular modem processor.

While specific embodiments have been described, those skilled in the art will appreciate that variations and modifications are possible. For instance, a cellular modem processor can include any number and combination of pipelines and can support any number of radio area networks, including 4G and/or 5G. Each pipeline can have its own control processor, or one control processor may be configured to dispatch instructions to multiple pipelines, as desired. A pipeline can include any number of processing engines, and the assignment of particular operations (or functional units) to processing engines can be modified as desired. The processing engines or functional units can be vector engines that perform the same operations in parallel on multiple inputs. Buffers between pipeline stages can be implemented using any type of memory circuit and can include any combination of dedicated buffers (with only one processing engine writing and only one processing engine reading) and shared buffers (where multiple processing engines may read and/or write). An interlock controller can use a variety of techniques to track data dependencies. The virtual address space used by the interlock controller can use a variety of addressing schemes, provided that different virtual addresses map to different physical buffer (or other memory) locations and virtual addresses can be defined at any desired level of granularity, e.g., a word, a row, a buffer, etc. Instructions dispatched to a pipeline can specify virtual addresses for the interlock controller either directly (e.g., the input and output virtual addresses can be operands of a dispatched instruction) or indirectly (e.g., operands of a dispatched instruction can include addresses in any address space that the dispatch queues in the processing engines can map to the virtual address space used by the interlock controller). Examples of processes implemented in firmware and particular firmware instructions provided herein are also illustrative. Where names are used for particular functional units or instructions, such names are for ease of description and are not intended to define or imply any particular ISA.

All processes described herein are illustrative and can be modified. Operations can be performed in a different order from that described, to the extent that logic permits; operations described above may be omitted or combined; and operations not expressly described above may be added.

Unless expressly indicated, the drawings are schematic in nature and not to scale. All numerical values presented herein are illustrative and not limiting. Reference to specific standards for cellular data communication (e.g., 4G LTE or 5G NR) are also for purposes of illustration; those skilled in the art with access to the present disclosure will be able to adapt the devices and methods described herein for compatibility with other standards.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise" or "can arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must). The word "can" is used herein in the same permissive sense (i.e., having the potential to, being able to).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set {w, x, y, z}, these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set {w, x, y, z}, thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to"

perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (*f*) during prosecution of a United States patent application based on this disclosure, Applicant will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Various embodiments may use computer program code to implement various features. Any such program code may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may include an internal storage medium of a compatible electronic device, which can be any electronic device having the capability of reading and executing the program code, and/or external storage media readable by the electronic device that can execute the code. In some instances, program code can be supplied to the electronic device via Internet download or other transmission paths.

Numerous variations and modifications will become apparent to those skilled in the art once the above disclosure is fully appreciated. It is intended that the following claims be interpreted to embrace all such variations and modifications.

What is claimed is:

1. A processing system comprising:
a plurality of processing engines, wherein the processing engines include functional units configured to execute an instruction having an input virtual address and an output virtual address, the plurality of processing engines including:
a first processing engine having a plurality of encoder functional units configured to execute a plurality of channel coding instructions to encode a code block, wherein different ones of the plurality of encoder functional units are configured to execute different channel coding instructions from the plurality of channel coding instructions; and
a second processing engine having a mapping functional unit configured to execute a mapping instruction to map at least a portion of a code block to one or more modulation symbols in a constellation;
a plurality of buffers coupled to the plurality of processing engines, wherein different buffers of the plurality of buffers are mapped to different virtual addresses in a virtual address space, the plurality of buffers including an encoder input buffer, an encoder output buffer, and a symbol buffer;
a control processor coupled to the processing engines and configured to dispatch a sequence of instructions to the processing engines to encode a plurality of code blocks including a physical uplink shared channel (PUSCH) code block and a physical uplink control channel (PUCCH) code block, wherein the sequence of instructions for a particular code block includes a selected channel coding instruction selected from the plurality of channel coding instructions having an input virtual address that maps to a first region in the encoder input buffer and an output virtual address that maps to a first region in the encoder output buffer and a mapping instruction having an input virtual address that maps to the first region in the encoder output buffer and an output virtual address that maps to a region in the symbol buffer; and
an interlock controller coupled to the plurality of processing engines and configured to manage data dependencies based on the input virtual addresses and the output virtual addresses of the instructions.

2. The processing system of claim 1 wherein the processing engines further include:
a respective dispatch queue configured to queue one or more instructions;
a respective dispatch queue interface configured to:
receive, in order, the dispatched instructions from the control processor;
queue the dispatched instructions in the dispatch queue for in-order execution; and
communicate a read-lock request for the input virtual address and a write-lock request for the output virtual address to the interlock controller; and
a respective instruction interface configured to communicate with the interlock controller to determine whether data dependencies for a next instruction queued in the dispatch queue are cleared, wherein the instruction interface initiates execution of the next instruction after the interlock controller indicates that the data dependencies are cleared.

3. The processing system of claim 1 wherein the plurality of encoder functional units includes a first encoder functional unit configured to perform low-density parity check (LDPC) coding on a code block in response to an LDPC channel coding instruction and a second encoder functional unit configured to perform polar coding on a code block in response to a polar channel coding instruction.

4. The processing system of claim 3 wherein the plurality of encoder functional units further includes a third encoder functional unit configured to perform Turbo coding on a code block in response to a Turbo channel coding instruction and a fourth encoder functional unit configured to perform convolutional coding on a code block in response to a convolutional channel coding instruction.

5. The processing system of claim 4 wherein the control processor is further configured such that:
when the sequence of instructions is dispatched to encode a PUSCH code block for a 5G radio area network, the selected channel coding instruction is the LDPC channel coding instruction;
when the sequence of instructions is dispatched to encode a PUCCH code block for a 5G radio area network, the selected channel coding instruction is the polar channel coding instruction;
when the sequence of instructions is dispatched to encode a PUSCH code block for a 4G radio area network, the selected channel coding instruction is the Turbo channel coding instruction; and
when the sequence of instructions is dispatched to encode a PUCCH code block for a 4G radio area network, the selected channel coding instruction is the convolutional channel coding instruction.

6. The processing system of claim 1 wherein the plurality of processing engines further includes a third processing engine having:
a first load functional unit configured to execute a data loading instruction to load a PUSCH code block from a shared memory, the data loading instruction having an output virtual address that maps to one of the encoder input buffers; and
a second load functional unit configured to execute an upstream control information (UCI) loading instruction to load a UCI code block based on UCI received from the control processor, the UCI loading instruction having an output virtual address that maps to one of the encoder input buffers,
wherein the control processor is further configured to dispatch the data loading instruction for a PUSCH code block prior to dispatching the selected channel coding instruction for the PUSCH code block and to dispatch the UCI loading instruction for a PUCCH code block prior to dispatching the selected channel coding instruction for the PUCCH code block.

7. The processing system of claim 1 wherein the second processing engine further includes one or more functional units configured to perform rate matching and interleaving for a code block prior to executing the mapping instruction.

8. The processing system of claim 1 wherein the plurality of processing engines further includes a third processing engine that includes a functional unit configured to execute a store instruction having an input virtual address that maps to a region in the symbol buffer and an output address that maps to a shared memory.

9. The processing system of claim 1 wherein the control processor is configured to dispatch instructions from the sequence of instructions for the PUSCH code block and instructions from the sequence of instructions for the PUCCH code block in an interleaved order.

10. A cellular modem processor comprising:
a plurality of processing pipelines including an uplink pipeline, wherein the uplink pipeline includes:
a plurality of processing engines, wherein the processing engines include functional units configured to execute an instruction having an input virtual address and an output virtual address, the plurality of processing engines including:
a first processing engine having a plurality of encoder functional units configured to execute a plurality of channel coding instructions to encode a code block, wherein different ones of the plurality of encoder functional units are configured to execute different channel coding instructions from the plurality of channel coding instructions; and
a second processing engine having a mapping functional unit configured to execute a mapping instruction to map at least a portion of a code block to one or more modulation symbols in a constellation;
a plurality of buffers coupled to the plurality of processing engines, wherein different buffers of the plurality of buffers are mapped to different virtual addresses in a virtual address space, the plurality of buffers including an encoder input buffer, an encoder output buffer, and a symbol buffer;
a control processor coupled to the processing engines and configured to dispatch a sequence of instructions to the processing engines to encode a plurality of code blocks including a physical uplink shared channel (PUSCH) code block and a physical uplink control channel (PUCCH) code block, wherein the sequence of instructions for a particular code block includes a selected channel coding instruction selected from the plurality of channel coding instructions having an input virtual address that maps to a first region in the encoder input buffer and an output virtual address that maps to a first region in the encoder output buffer and a mapping instruction having an input virtual address that maps to the first region in the encoder output buffer and an output virtual address that maps to a region in the symbol buffer; and
an interlock controller coupled to the plurality of processing engines and configured to manage data dependencies based on the input virtual addresses and the output virtual addresses of the instructions.

11. The cellular modem processor of claim 10 wherein the plurality of pipelines further includes a physical downlink control channel (PDCCH) decode pipeline configured to decode downlink control information received via a radio area network and wherein the control processor is further configured to provide configuration parameters to the uplink pipeline based at least in part on the decoded downlink control information.

12. The cellular modem processor of claim 10 further comprising:
a shared memory coupled to at least two of the processing pipelines, including the uplink pipeline.

13. The cellular modem processor of claim 12 wherein the plurality of encoder functional units includes a first encoder functional unit configured to perform low-density parity check (LDPC) coding on a code block in response to an LDPC channel coding instruction and a second encoder functional unit configured to perform polar coding on a code block in response to a polar channel coding instruction.

14. The cellular modem processor of claim 13 wherein the plurality of encoder functional units further includes a third encoder functional unit configured to perform Turbo coding on a code block in response to a Turbo channel coding instruction and a fourth encoder functional unit configured to perform convolutional coding on a code block in response to a convolutional channel coding instruction.

15. The cellular modem processor of claim 10 wherein the control processor is configured to dispatch instructions from the sequence of instructions for the PUSCH code block and instructions from the sequence of instructions for the PUCCH code block in an interleaved order.

16. A method comprising:
generating, at a cellular modem processor having an uplink pipeline and a control processor, a first code block containing data to be transmitted using a physical uplink shared channel (PUSCH);
generating, by the cellular modem processor, a second code block containing uplink control information to be transmitted using a physical uplink control channel (PUCCH);
dispatching, by the control processor, a first sequence of instructions to the uplink pipeline for the first code block and a second sequence of instructions to the uplink pipeline for the second code block,
wherein the first sequence of instructions includes a first channel coding instruction selected from a plurality of channel coding instructions, the first channel coding instruction having an input virtual address that maps to a first region in an encoder input buffer and an output virtual address that maps to a first region in an encoder output buffer, a first rate matching instruction having an input virtual address that maps to the first region in the encoder output buffer, and a first mapping instruction that operates on a bit sequence generated by the first rate matching instruction,
wherein the second sequence of instructions includes a second channel coding instruction selected from the plurality of channel coding instructions, the second channel coding instruction having an input virtual address that maps to a second region in an encoder input buffer and an output virtual address that maps to a second region in an encoder output buffer, a second rate matching instruction having an input virtual address that maps to the second region in the encoder output buffer, and a second mapping instruction that operates on a bit sequence generated by the second rate matching instruction;
receiving the dispatched instructions in respective dispatch queues in a plurality of processing engines in the uplink pipeline, wherein the processing engine in which a particular issued instruction is received includes a functional unit configured to execute the particular issued instruction;

sending, by the processing engines in response to receiving a dispatched instruction, a read-lock request for the input virtual address and a write-lock request for the output virtual address to an interlock controller of the uplink pipeline;

issuing, from the dispatch queues, dispatched instructions to the functional units configured to execute the instructions, wherein instructions in a same one of the dispatch queues are issued in order and wherein the instruction interface issues a next instruction only after the interlock controller confirms, based on the input virtual address and the output virtual address, that data dependencies for the next instruction have been cleared; and executing issued instructions by the functional units, wherein executing an issued instruction includes one or both of reading from the region mapped to the input virtual address or writing to the region mapped to the output virtual address.

17. The method of claim 16 wherein the first channel coding instruction is executed by a first functional unit in a first one of the processing engines, the first functional unit being configured to perform low-density parity check (LDPC) coding, and the second channel coding instruction is executed by a second functional unit in the first one of the processing engines, the second functional unit being configured to perform polar coding.

18. The method of claim 16 wherein the first channel coding instruction is executed by a first functional unit in a first one of the processing engines, the first functional unit being configured to perform Turbo coding, and the second channel coding instruction is executed by a second functional unit in the first one of the processing engines, the second functional unit being configured to perform convolutional coding.

19. The method of claim 16 wherein:

when the control processor is operating the uplink pipeline in a 5G mode, the first channel coding instruction is an instruction to perform low-density parity check (LDPC) coding and the second channel coding instruction is an instruction to perform polar coding; and when the control processor is operating the uplink pipeline in a 4G mode, the first channel coding instruction is an instruction to perform Turbo coding and the second channel coding instruction is an instruction to perform convolutional coding.

20. The method of claim 16 wherein:

the first sequence of instructions includes a first load instruction to read data for the code block from an externally-shared memory, the load instruction having an output virtual address that maps to the first region in the encoder input buffer, wherein the first load instruction is prior to the first channel coding instruction in the first sequence; and the second sequence of instructions includes a second load instruction to load uplink control information from the control processor, the second load instruction having an output virtual address that maps to the second region in the encoder input buffer, wherein the second load instruction is prior to the second channel coding instruction in the second sequence.

* * * * *